US011004643B2

(12) United States Patent
Hendrixson, III et al.

(10) Patent No.: US 11,004,643 B2
(45) Date of Patent: May 11, 2021

(54) REMOTE CONTROLLED CIRCUIT BREAKER PANEL SYSTEM

(71) Applicant: Miller-Eads Co. Inc., Indianapolis, IN (US)

(72) Inventors: Charles W. Hendrixson, III, Reelsville, IN (US); Simon G. Wright, Greencastle, IN (US); Sean M. Hagan, Anderson, IN (US)

(73) Assignee: Miller-Eads Co. Inc., Indianapolis, IN (US)

( * ) Notice: Subject to any disclaimer, the term of this patent is extended or adjusted under 35 U.S.C. 154(b) by 0 days.

(21) Appl. No.: 16/366,463

(22) Filed: Mar. 27, 2019

(65) Prior Publication Data

US 2019/0221395 A1    Jul. 18, 2019

Related U.S. Application Data

(62) Division of application No. 15/252,634, filed on Aug. 31, 2016, now Pat. No. 10,283,302.

(51) Int. Cl.
| *H01H 71/68* | (2006.01) |
| *H02J 13/00* | (2006.01) |
| *H02J 9/06*  | (2006.01) |
| *H02B 1/03*  | (2006.01) |
| *H02B 1/42*  | (2006.01) |

(52) U.S. Cl.
CPC ......... *H01H 71/68* (2013.01); *H02J 13/0006* (2013.01); *H02B 1/03* (2013.01); *H02B 1/42* (2013.01); *H02J 9/062* (2013.01); *Y02B 90/20* (2013.01); *Y04S 20/12* (2013.01)

(58) Field of Classification Search
CPC ...... H01H 71/68; H02J 9/062; H02J 13/0006; H02B 1/42; H02B 1/03; H02H 1/00
See application file for complete search history.

(56) References Cited

U.S. PATENT DOCUMENTS

| 5,185,705 | A | 2/1993 | Farrington |
| 5,373,411 | A | 12/1994 | Grass et al. |
| 5,821,876 | A | 10/1998 | Farrington et al. |
| 5,909,180 | A | 6/1999 | Bailey et al. |
| 6,034,581 | A | 3/2000 | DiMarco et al. |
| 6,271,759 | B1 | 8/2001 | Weinbach et al. |

(Continued)

*Primary Examiner* — Jared Fureman
*Assistant Examiner* — Duc M Pham
(74) *Attorney, Agent, or Firm* — Woodard, Emhardt, Henry, Reeves & Wagner, LLP

(57) ABSTRACT

A electrical distribution system has been developed to provide a remote central control point for individual circuits, and methods have been developed for retrofitting it to existing service panels or installing it into new service panels. This system provides a power circuit monitoring and control system that fits inside standard residential service panels, both new and retrofitted panels. The entire system can be retrofitted into existing breaker panel systems without the need of removing any permanent structure such as a wall. During this retrofit process, the panel cover on the existing distribution panel is first removed after the power to it is disconnected. The old breaker assembly is removed from the panel, and a circuit controller is then installed in the now available space within the panel. A new service panel enclosure with a circuit breaker assembly is installed directly over top of the enclosure.

28 Claims, 22 Drawing Sheets

(56) References Cited

U.S. PATENT DOCUMENTS

| | | |
|---|---|---|
| 6,671,148 B2 | 12/2003 | Evans et al. |
| 6,714,107 B2 | 3/2004 | Mody et al. |
| 6,734,768 B2 | 5/2004 | Kim |
| 6,767,937 B2 | 7/2004 | Schunk et al. |
| 7,391,299 B2 | 6/2008 | Bender et al. |
| 7,495,574 B2 | 2/2009 | Rocamora et al. |
| 7,612,654 B2 | 11/2009 | Bender et al. |
| 8,004,418 B2 | 8/2011 | Hetzmannseder et al. |
| 8,032,260 B2 | 10/2011 | Hill, III et al. |
| 8,686,596 B2 | 4/2014 | Huss et al. |
| 8,902,558 B2 | 12/2014 | Menezes et al. |
| 9,042,073 B2 | 5/2015 | Mills et al. |
| 9,054,516 B2 | 6/2015 | Watford |
| 9,219,361 B1 | 12/2015 | Wine et al. |
| 9,501,803 B2 | 11/2016 | Kumar et al. |
| 2002/0010518 A1* | 1/2002 | Reid .................... H05B 47/175 700/31 |
| 2003/0071719 A1 | 4/2003 | Crenshaw et al. |
| 2005/0180069 A1 | 8/2005 | Tchernobrivets |
| 2005/0201044 A1 | 9/2005 | Baca |
| 2007/0103835 A1 | 5/2007 | Sorenson |
| 2010/0314940 A1* | 12/2010 | Palmer ................ H02J 13/0086 307/39 |
| 2014/0211345 A1 | 7/2014 | Thompson et al. |
| 2015/0012145 A1 | 1/2015 | Kiko |
| 2015/0109077 A1 | 4/2015 | Tomimbang et al. |

\* cited by examiner

REMOTE CONTROLLED CIRCUIT BREAKER PANEL SYSTEM

CROSS-REFERENCE TO RELATED APPLICATION

This application is a divisional of U.S. application Ser. No. 15/252,634 filed Aug. 31, 2016, which is hereby incorporated by reference.

BACKGROUND

Due to economic and environmental concerns, recently there has been an increasing desire to conserve energy. Many electrically powered systems unnecessarily drain power when not in use. This waste of energy causes an increase in peak electrical demand which in turn causes utilities to operate additional power plants to satisfy the peak demand. The added cost from this additional capacity is then passed on to consumers. Systems have been proposed that allow businesses and utilities to remotely monitor usage and/or shut down electrical equipment to conserve energy. For instance, specialized circuit breakers have been developed that allow businesses to remotely shut down nonessential electrical circuits within their facilities. However, retrofitting these remote electrical control systems to preexisting infrastructures, such as residential homes, has been a difficult and expensive process. Some proposed systems require additional equipment and/or wiring that require significant demolition and reconstruction of various structures (e.g., walls) within facilities. Thus, there is a need for improvement in this field.

SUMMARY

A unique electrical distribution system has been developed to provide a remote central control point for individual circuits. Unique methods of retrofitting the system to existing service panels or installing it into new service panels have also been developed. This system provides a power circuit monitoring and control system that fits inside standard residential electrical service panels. The entire power circuit monitoring and control system can be retrofitted into existing service panel systems without the need of removing any permanent structure such as a wall. During this retrofit process, the panel cover on the existing service panel is first removed after the power to it is disconnected. Upon labeling and disconnecting each of the circuits in the panel, the old breakers are removed from the panel.

Initially, a distribution a distribution block and an anti-islanding contactor are installed between the feed from an electrical service meter and the main breaker of the new breaker panel. A circuit control module is then installed in the now available space within the panel. The circuit control module has circuit terminals to which the circuits are connected and source power terminals configured to connect to the circuit breakers in the new service panel enclosure. The new service panel enclosure is installed directly over top of the rough-in service panel enclosure. In one form, the new service panel enclosure is hinged to allow access to the rough-in enclosure and circuit controller assembly. The service panel enclosure includes a series of common or standard circuit breakers. It does not require the specialized remote control breakers that require expensive individual plug-in type controllers and/or specialized circuit breakers found in other remote power control systems (although remote control or other specialized circuit breakers can be used if so desired). Electrical service is then connected to the new main breaker and sub-breaker assembly. A second hinged enclosure is installed over the new power distribution panel. This second enclosure can include a controller in the form of a micro personal computer (PC) and a touchscreen that is connected to the controller. The touchscreen allows the user to monitor any number of aspects about the system, such as power consumption, battery status, alternative energy status, and the like. The micro PC provides expandability to control and monitor existing and future devices as well as appliances. It can utilize any number of communication protocols to communicate with any number of devices or subsystems. For example, the consumer can control and/or monitor the operation of the system remotely via a computer, tablet, or smart phone.

With this combination of the circuit control modules and the controller, the system is able to provide greater power control flexibility in a number of situations. For example, it allows the user to control their energy usage by activating the circuits individually so as to, among other things, disable high power consuming circuit feeds during peak demand. It can also communicate with power generators, inverters, and/or battery systems so as to automatically enable or disable circuits while emergency power is used and shut off nonessential circuits. When authorized by the consumer, the system also can allow utilities to remotely control the circuits so as to temporarily disconnect loads during peak demand periods or permanently disconnect/reconnect service. Individual circuits can be opened and closed without the need for tripping (i.e., opening/closing) the circuit breakers. This in turn allows conventional circuit breakers to be used, if so desired. The consumer, using the touchscreen or remote devices, such as their smart phones, tablets, or PCs, can designate which individual circuits may be controlled by the utility. This system can also be used to facilitate data collection so that utilities can gather energy usage information so as to better understand energy usage patterns and performance, among other things. In addition it can be used to coordinate load shedding and supplemental capacity during peak usage periods for backup battery systems and electrical vehicles (EVs). The system also can be integrated with fire and security systems so as to disable preselected circuits during emergency situations such as fires.

Aspect 1 concerns a service panel system, comprising a controller; a circuit control module operatively connected to the controller; a base service panel enclosure; an extension service panel enclosure attached to the base service panel enclosure; and a circuit breaker housed inside the extension service panel enclosure, wherein the circuit breaker is electrically connected to the circuit control module.

Aspect 2 concerns the system of any preceding aspect, wherein the circuit control module is electrically connected between the circuit breaker and a circuit.

Aspect 3 concerns the service panel system of any preceding aspect, wherein the circuit control module includes a transducer to monitor an electrical property of the circuit; and the circuit control module transmits a signal indicative of the electrical property of the circuit to the controller.

Aspect 4 concerns the service panel system of any preceding aspect, wherein the circuit control module includes a switch to open and close the circuit; and the controller is configured to open and close the circuit by transmitting a signal to the circuit control module.

Aspect 5 concerns the service panel system of any preceding aspect, wherein the circuit control module includes a switch to open the circuit without tripping the circuit breaker.

Aspect 6 concerns the service panel system of any preceding aspect, wherein the circuit breaker is a standard, non-remotely controlled circuit breaker.

Aspect 7 concerns the service panel system of any preceding aspect, further comprising wherein the circuit control module has a terminal; and a load wire electrically connecting the circuit breaker to the terminal of the circuit control module.

Aspect 8 concerns the service panel system of any preceding aspect, wherein the extension service panel enclosure includes a mounting wall; and the circuit breaker is mounted to one side of the mounting wall and the circuit control module is mounted to the side of the mounting wall opposite the circuit breaker.

Aspect 9 concerns the service panel system of any preceding aspect, further comprising a main power control module operatively connected to the controller; and a main circuit breaker connected electrically connected between the main power control module and the circuit breaker.

Aspect 10 concerns the service panel system of any preceding aspect, wherein the main power control module is mounted in the base service panel enclosure; and the main circuit breaker is mounted in the extension service panel enclosure.

Aspect 11 concerns the service panel system of any preceding aspect, wherein the main power control module includes a main power disconnect switch; and the main power control module has a transducer located between the main power disconnect switch and a utility electrical power source to sense whether the utility electrical power source is supplying electrical power.

Aspect 12 concerns the service panel system of any preceding aspect, further comprising an auxiliary power control module operatively connected to the controller, wherein the auxiliary power control module includes an inverter; a battery pack electrically connected to the inverter; and wherein the inverter is electrically connected to the circuit breaker.

Aspect 13 concerns the service panel system of any preceding aspect, wherein the controller is designed to automatically enable or disable a circuit connected to the circuit breaker when auxiliary power is active.

Aspect 14 concerns the service panel system of any preceding aspect, wherein the controller is configured to automatically disable a circuit connected to the circuit breaker during emergency or safety hazard situations.

Aspect 15 concerns the service panel system of any preceding aspect, wherein the controller is configured to control auxiliary power system and/or an electrical vehicle (EV) for coordinating load shedding and supplemental capacity during peak usage periods.

Aspect 16 concerns the service panel system of any preceding aspect, wherein the controller is configured to allow a utility to control a circuit connected to the circuit breaker to temporarily disable the circuit during peak demand periods.

Aspect 17 concerns the service panel system of any preceding aspect, wherein the base service panel enclosure is a preexisting enclosure from a preexisting service panel.

Aspect 18 concerns the service panel system of any preceding aspect, wherein the extension service panel enclosure defines one or more wiring openings that open into the base service panel enclosure.

Aspect 19 concerns the service panel system of any preceding aspect, further comprising an adapter connected to the base service panel enclosure, wherein the adapter has an adapter hinge connected to the extension service panel enclosure.

Aspect 20 concerns the service panel system of any preceding aspect, further comprising a breaker access door; an outer cover; and wherein the extension service panel enclosure includes a double hinge securing the breaker access door and the outer cover to the extension service panel in a hinged manner.

Aspect 21 concerns the service panel system of any preceding aspect, wherein the outer cover has a touchscreen display operatively connected to the controller.

Aspect 22 concerns the service panel system of any preceding aspect, further comprising an outer cover covering the extension service panel enclosure; and wherein the controller is mounted inside the outer cover to facilitate wireless communication with the controller.

Aspect 23 concerns the service panel system of any preceding aspect, further comprising an input/output device mounted to the outside cover on a side opposite the controller.

Aspect 24 concerns the service panel system of any preceding aspect, further comprising a switch operatively connecting the controller to the circuit control module.

Aspect 25 concerns the service panel system of any preceding aspect, wherein the switch is a powered Ethernet switch configured to power the controller and the circuit control module.

Aspect 26 concerns the service panel system of any preceding aspect, wherein a universal power supply is connected to the switch for powering the switch.

Aspect 27 concerns the service panel system of any preceding aspect, further comprising a main power control module operatively connected to the controller through the switch; and an auxiliary power control module operatively connected to the controller through the switch.

Aspect 28 concerns the service panel system of any preceding aspect, further comprising a computer operatively connected to the controller, wherein the computer is configured to remotely control and monitor the circuit breaker via the controller and the circuit control module.

Aspect 29 concerns the service panel system of any preceding aspect, wherein the extension service panel includes a panel door; the circuit control module includes a relay and a current transducer; and the relay and current transducer are mounted on opposite sides of the panel door.

Aspect 30 concerns the service panel system of any preceding aspect, wherein the panel door that forms a gap allows wiring to wrap around the panel door between the relay and the current transducer.

Aspect 31 concerns the service panel of any preceding aspect, wherein the relay includes one or more exterior connectors extending from a side of the relay and one or more interior connectors; the exterior connectors are L-shaped; and the interior connectors are zig-zag shaped.

Aspect 32 concerns a service panel system, comprising a controller; a main power control module operatively connected to the controller, wherein the main power control module is configured to receive electrical power from a utility; a circuit control module operatively connected to the controller; and a circuit breaker assembly electrically connected between the main power control module and the circuit control module including a main circuit breaker electrically connected to the main power control module to receive the electrical power from the main power control module, and a plurality of circuit breakers electrically connected to the main circuit breaker, wherein the circuit breakers are electrically connected to the circuit control module.

Aspect 33 concerns the service panel system of any preceding aspect, wherein the main power control module includes a main power disconnect switch; and the main power control module is configured to monitor the electrical power upstream from the main power disconnect switch to sense whether the utility is supplying the electrical power.

Aspect 34 concerns the service panel system of any preceding aspect, wherein the circuit control module for each of the circuit breakers includes a load shed switch to open load circuits without tripping the circuit breakers, and a transducer to monitor an electrical property of the load circuits.

Aspect 35 concerns the service panel system of any preceding aspect, wherein the circuit breaker assembly includes a bus bar electrically connecting the main circuit breaker with the circuit breakers.

Aspect 36 concerns the service panel system of any preceding aspect, further comprising a powered switch operatively connected to the controller, main power control module, and the circuit control module to facilitate communication, wherein the powered switch powers the controller, main power control module, and the circuit control module; and a power supply connected to the powered switch for powering the powered switch during a power outage.

Aspect 37 concerns the service panel system of any preceding aspect, further comprising an auxiliary power control module operatively connected to the controller.

Aspect 38 concerns the service panel system of any preceding aspect, further comprising a harness electrically connecting the circuit control module to load circuits.

Aspect 39 concerns a method, comprising mounting an extension service panel enclosure onto a base service panel enclosure, wherein the extension service panel enclosure includes a circuit breaker assembly and a circuit control module electrically connected to the circuit breaker assembly; and connecting the circuit control module electrically to one or more circuit wire leads located inside the base service panel enclosure.

Aspect 40 concerns the method of any preceding aspect, further comprising removing a circuit breaker assembly from the base service panel enclosure before said mounting the extension service panel enclosure.

Aspect 41 concerns the method of any preceding aspect, further comprising connecting a controller to a switch; and connecting the circuit control module to the switch to create an operative connection between the controller and the circuit control module.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
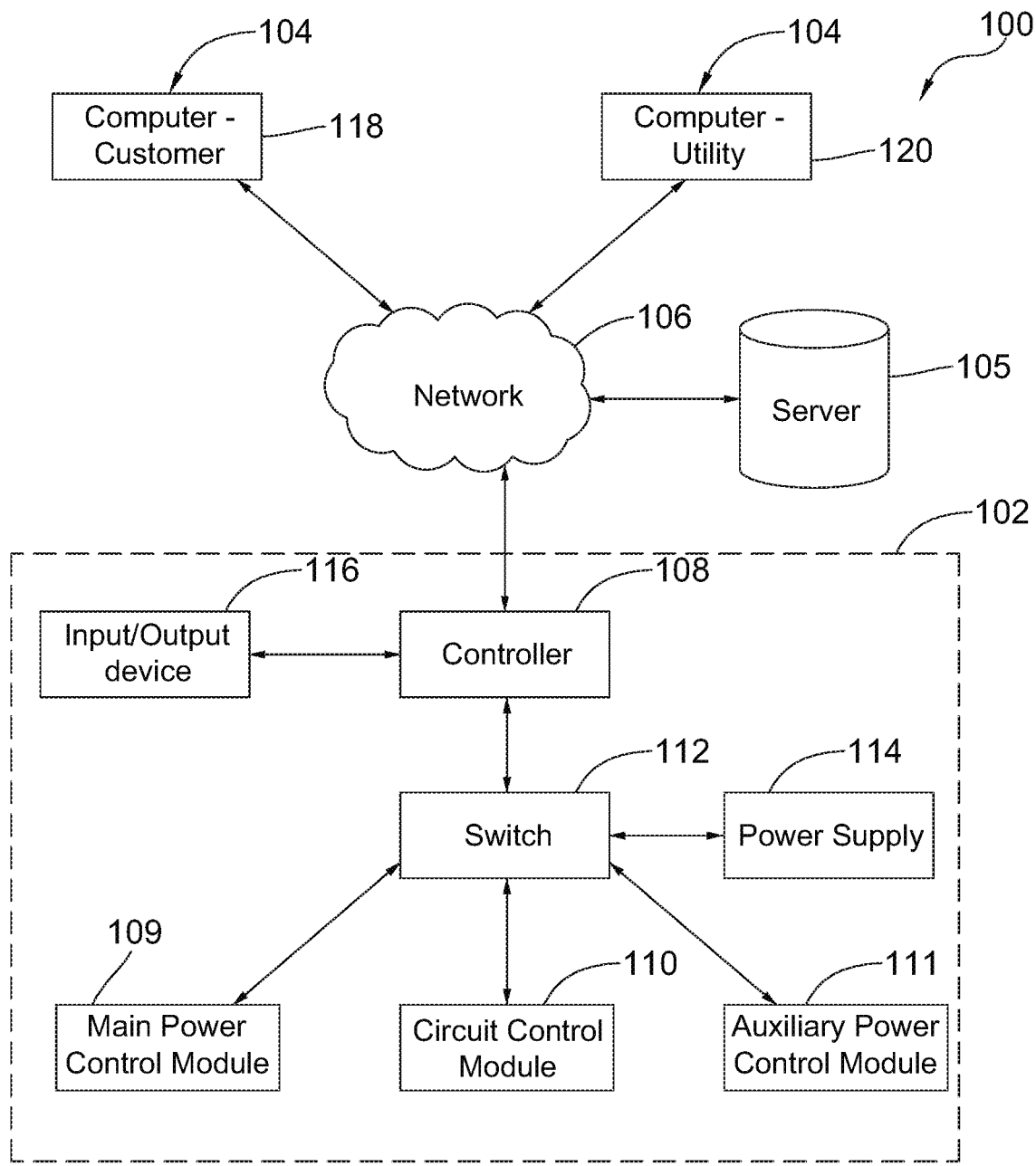
FIG. 1 is a block diagram of one example of a power circuit monitoring and control system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a block diagram of one example (of many) of a power circuit monitoring/control system or service panel system 100. The system 100 is configured to monitor and control the electrical power usage of individual electrical power circuits, either remotely or locally. This system 100 is able to integrate into existing or new residential electrical distribution panels. A touchscreen interface and/or cloud-based interface allows homeowners (or others) to make intelligent choices by monitoring electrical consumption. While the system 100 will be described for a residential setting, it should be recognized that the system 100 can also be used to manage and monitor electrical power consumption in commercial environments.

Figure 2:
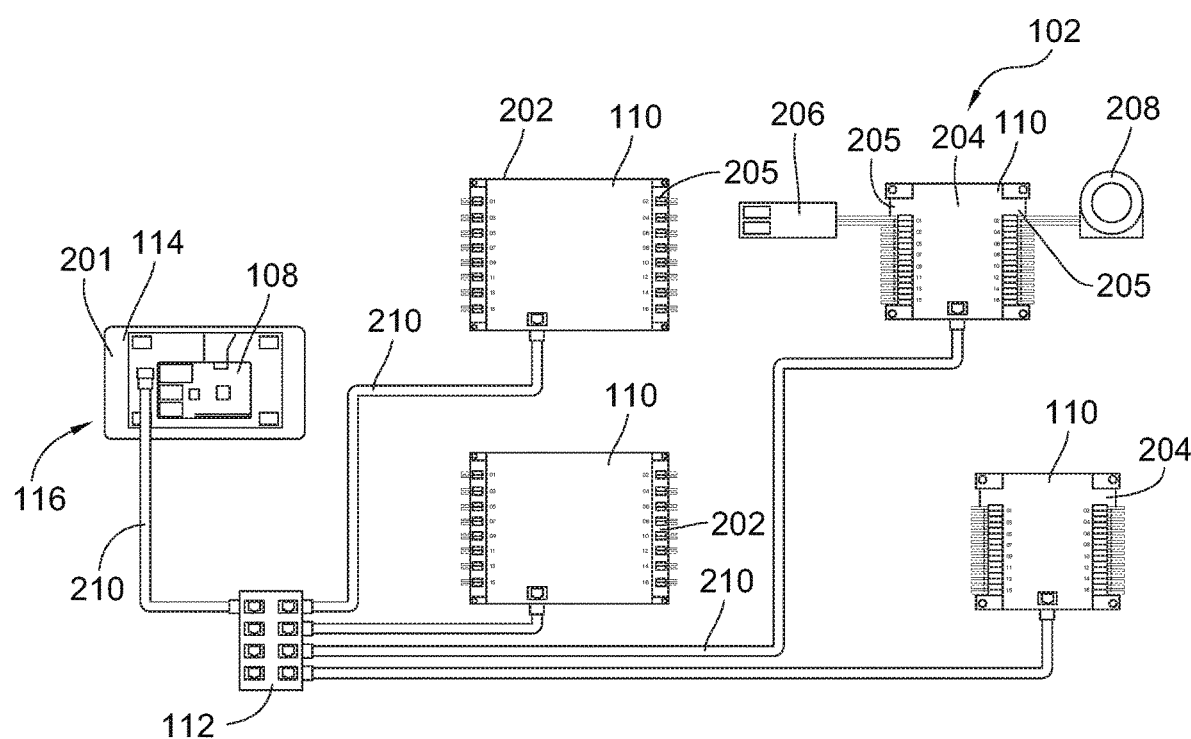
FIG. 2 is a schematic of the connections between various components found in a local control system for the FIG. 1 system.

As shown, the system 100 includes one or more local control systems 102 that are operatively coupled to one or more computers 104 and a server 105 via a network 106, such as the Internet and/or other networks (e.g., wire, wireless, wide-area and/or local-area networks). The computers 104, such as a personal computer or smart phone, are configured to remotely monitor and/or control the local control systems. As will be explained in greater detail below, the computers 104 can be located in the facility being monitored and/or controlled or at a utility supplying the electrical power. As shown in FIGS. 1 and 2, the local control systems 102 include one or more controllers 108 that are operatively coupled to the network 106, such as via a wired and/or wireless network connection. The controller 108 is operatively connected to one or more main power 109, circuit 110, and auxiliary power 111 control modules via one or more switches 112. The main power control module 109 is configured to monitor and/or control (e.g., connect or disconnect) power supplied to the local control system 102 from the utility. The circuit control modules 110 are configured to monitor and/or control power for individual circuits within the local control system 102. The auxiliary power control module 111 is configured to monitor and/or control power from auxiliary power sources, such as solar, battery, geothermal, and/or wind power sources, which are typically (but not always) located at or near the local site. These auxiliary power sources are typically, but not always, used to supplement and/or temporarily substitute for the power supplied from the utility. For example, the auxiliary power control module 111 can be used to operate a battery backup system for the local control system 102. One of each type of control module 109, 110, 111 is shown in FIG. 1, but it should be recognized that other variations of the system 102 can include more (or less) control modules than is shown as well as different combinations of control modules. For instance, the local control system 102 in one variation includes a single main power control module 109, multiple circuit control modules 110, and a single auxiliary power control module 111.

A switch 112 provides a communication link between the controller 108 and the control modules 109, 110, 111. The switch 112 is powered by a power supply 114. The power supply 114 in one form is configured to temporarily supply power even during a power outage. The power supply 114 includes a battery, capacitor, and/or other energy storage device to store the energy. The temporary power provided by the power supply 114 allows the controller 108 to shut down the system 102 in an orderly fashion so that the components of the system 102 are able to properly restart when power is restored. In one example, the switch 112 is a power over Ethernet type switch, and the power supply is a Universal Power Supply (UPS). The power supply 114 can be powered by electricity from the utility and/or an auxiliary power source. In other examples, the switch 112 can be unpowered. The switch 112 in other alternatives can include a wireless access point (WAP) and/or wireless router. By utilizing power over Ethernet technology, simplified and efficient installation is realized. Additionally, the system 100 allows for the circuit control modules 110 to be remote from other devices in the system 100. The switch 112 can also act as a gateway to remotely monitor and control other smart devices for home automation. In another example, the switch 112 can include a router or similar device to promote communication over a wide area network (WAN).

The controller 108 helps to control the operation of the system 100 and has many functions. The controller 108 includes a processor and memory configured to receive information from the control modules 109, 110, 111 and is further configured to send commands so as to control the control modules 109, 110, 111. In one form, the controller 108 is a micro-personal computer (PC), such as a Raspberry Pi computer. The controller 108 interfaces with the control modules 109, 110, 111 via the switch 112. The controller 108 is operatively connected to an input/output (I/O) device 116 that allows a user to directly interface with the controller 108. The controller 108 is also operatively connected to the computers 104 via the network 106. In the illustrated example, the computers 104 include a customer computer 118 that allows a customer of the utility to remotely (or locally) interface with the system 102 and a utility computer 120 that allows the utility to remotely interface with the system 102. For example, a customer using a web-based graphical user interface on the customer computer 118 or the I/O device 116 can designate which circuits the utility can control and/or deactivate under certain circumstances as well as monitor their energy consumption via the controller. Since the I/O device 116 is directly connected to and powered by the controller 108 (through the power supply 114), the customer via the I/O device 116 is still able to interface with the controller 108 to monitor and control the system even when the connection to the network is down and/or during power outage situations. Similarly, if they have the proper permissions granted by the customer, personnel at the utility can monitor and control the system 102 via the utility computer 104.

The network 106 also allows the computers 104 and/or controller 108 to interface with the server 105. In one form, the server 105 is configured to automatically control and monitor the local control systems 102 as well as provide status information about the utility. For example, the server 105 can notify a controller 108 of peak loads or power interruptions so that various circuits controlled by the local control system 102 can be powered down (or up) to address the issues. It should be noted that the controller 108 is configured to operate independently, if needed, such as to control the local control system 102 when the network connection to the computers and/or server is disconnected. The server 105 in one form further includes a database that maintains historical usage data about the circuits controlled by the local control system 102. By utilizing circuit control programs accessed via the computers 104 or I/O device 116, electrical power consumption can be controlled to save energy and/or shift power consumption. This allows the utility to monitor and control high power consumption loads, such as water heaters, HVAC systems, etc.

In one example illustrated in FIG. 2, the I/O device 116 includes a touchscreen type display 201. In one version, the controller 108 is mounted to the backside of the touchscreen display 201, but the controller 108 in other variations can be mounted elsewhere. The input and output functions of the I/O 116 in other versions can be carried out by separate devices, such as by a separate keyboard and display, and/or in other ways (e.g., via audio).

The system 100 is able to monitor and switch individual circuit loads depending on the electrical power demand and/or home owner preference. The circuit control modules 110 both measure the power consumption for each individual power circuit and allow the system 100 to switch the power. This switching feature can be utilized as an energy management solution. As depicted in FIG. 2, the circuit control modules 110 can have different sizes and/or configurations depending on the number of circuit breakers being controlled. For instance, the types of circuit control modules 110 can include a compact circuit control module version 202 that is used for circuits with standard voltages/currents (e.g., 110-120V) and an extended range circuit control module version 204 that is used for circuits having current/voltages beyond the limits of the compact version 202 (e.g., 220-240V). Each circuit control module 110 includes one or more terminals 205 that are configured to electrically connect with an electrical circuit. Typically, but not always, the terminals 205 are connected to a corresponding circuit breaker for an electrical circuit being controlled and/or monitored, but the terminals 205 can be connected to other electrical circuits/components. For example, as is shown in FIG. 2, the terminals 205 of one of the extended circuit control modules 204 are electrically connected to an external relay 206 and an external current transformer 208. It should be recognized that the circuit control modules 110 can be sized and/or configured differently in other examples.

As shown, the main components of the local control system 102 are operatively connected together with communication cables 210 that are all connected to the switch 112. In one form, the cables 210 are Ethernet cables, and in the illustrated example, the cables 210 include powered Ethernet cables. The controller 108 along with the touchscreen display 201 are powered by the switch 112 via the powered Ethernet cables 210, and the switch 112 in turn is powered by the power supply 114 (FIG. 1). In one form, the switch 112 via the cables 210 further provides power and communication to the circuit control modules 110. It is envisioned that in other variations, the controller 108, the circuit control modules 110, and/or the I/O device 116 can be connected and powered in other manners.

Among other things, the circuit control modules 110 monitor power consumption of individual circuits attached to circuit breakers and report the usage to the controller 108. Based on commands and/or information received from the controller 108, the circuit control modules 110 are also configured to individually activate and/or deactivate various electrical power circuits within a facility, such as a house, office, warehouse, or manufacturing plant. For example, the system 100 allows a consumer and/or utility to control energy usage by activating the circuits individually so as to, among other things, disable high power consuming circuit feeds during peak demand. The system 100 can also communicate with power generators, inverters, and/or battery systems so as to automatically enable or disable circuits while emergency power is used and shut off nonessential circuits. When authorized by the customer, the system 100 also can allow utilities to remotely control the circuits so as to temporarily disconnect loads during peak demand periods or permanently disconnect/reconnect service. The customer using the I/O device 116, the customer computers 118, or other interfaces can designate which individual circuits may be controlled by the utility. The system 100 can also be used to facilitate data collection so that utilities can gather energy usage information and store it on the server 105 so as to better understand energy usage patterns and performance, among other things. Furthermore, the system 100 can be used to coordinate load shedding and supplemental capacity during peak usage periods for backup battery systems and electrical vehicles (EVs). The local control system 102 also can be integrated with fire and security systems so as to disable preselected circuits during emergency situations such as fires.

Figure 3:
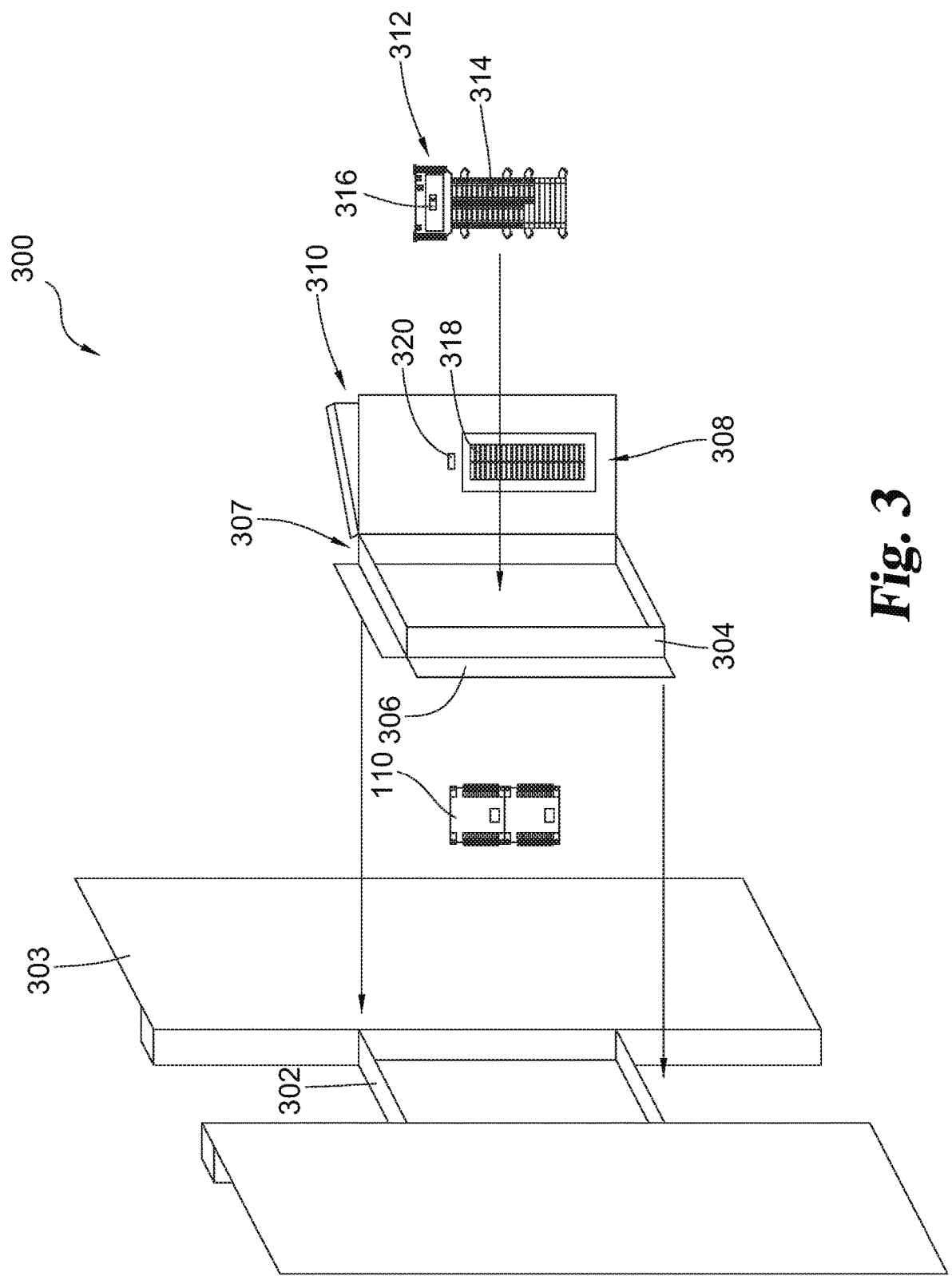
FIG. 3 is an exploded view of a service panel system used in the FIG. 1 system.

FIG. 3 shows an exploded view of a service panel 300 that houses the circuit control modules 110. As shown, the service panel 300 includes a first electrical distribution tub or base service panel enclosure 302 that is typically (but not always) mounted inside of or to a wall 303 of the residence/facility, and a second electrical distribution tub or extension service panel enclosure 304 is mounted to the base service panel enclosure 302 via an adapter 306. If desired, the service panel 300 can fit inside the footprint of standard service panels, both new and retrofitted panels. The entire service panel 300 can be retrofitted into existing service panel systems without the need of removing any permanent structure such as the wall 303 or its studs. The base service panel enclosure 302 in one example can be a preexisting electrical distribution tub for retrofitting purposes. In another example, the base service panel enclosure 302 can be a new one that is used for new construction. In the illustrated example, the base service panel enclosure 302 is mounted between two studs inside the wall 303, but in other examples, the enclosure 302 can be mounted in other manners. As will be explained in greater detail below, the base service panel enclosure 302 houses the main power control module(s) 109. Once assembled, the extension service panel enclosure 304 is secured via the adapter 306 to the base service panel enclosure 302 in any number of manners, such as via screws, bolts, and/or a snap-fit type connection. The adapter 306 in one form is secured to the studs in the wall 303 that book-end the base service panel enclosure. In one example, the extension service panel enclosure 304 extends away from the wall 303 such that the extension service panel enclosure 304 is not flush with the wall 303. However, the base service panel enclosure 302 can be recessed further into the wall 303 in other examples such that the outer surface of the entire service panel 300 is generally flush with the wall 303.

The service panel 300 includes a hinge system 307 that connects the adapter 306 and various portions of the extension service panel enclosure 304 together in a hinged manner. Most codes prohibit hard enclosures that prevent easy access to electrical connections and/or circuit breakers. The hinge system 307 allows the various compartments and doors to be readily opened for easy access and closure. The hinge system 307 forms a hinge connection between the adapter 306 and the extension service panel 304 so that the base service panel enclosure 302 can be readily accessed. As shown, a breaker access panel door 308 and an outer cover 310 are hung on the extension service panel 304 via the hinge system 307. With the hinge system 307, both the breaker access panel 308 and the outer cover 310 are able to swing open and close the extension service panel enclosure 304. Inside, the extension service panel enclosure 304 houses a circuit breaker assembly 312 that includes one or more circuit breakers 314 and a main breaker 316. The breaker access panel 308 has one or more circuit breaker openings 318 through which the actuator levers or switches of the circuit breakers 314 extend and at least one main breaker opening 320 for the lever or switch of the main breaker 316. As noted before, the circuit breakers 314, 316 in the service panel 300 are common or standard circuit breakers, and the service panel 300 does not necessarily require the specialized remote control breakers, such as SQUARE D® POWERLINK® brand circuit breakers, so as to facilitate remote monitoring and/or control of the circuits.

Figure 4:
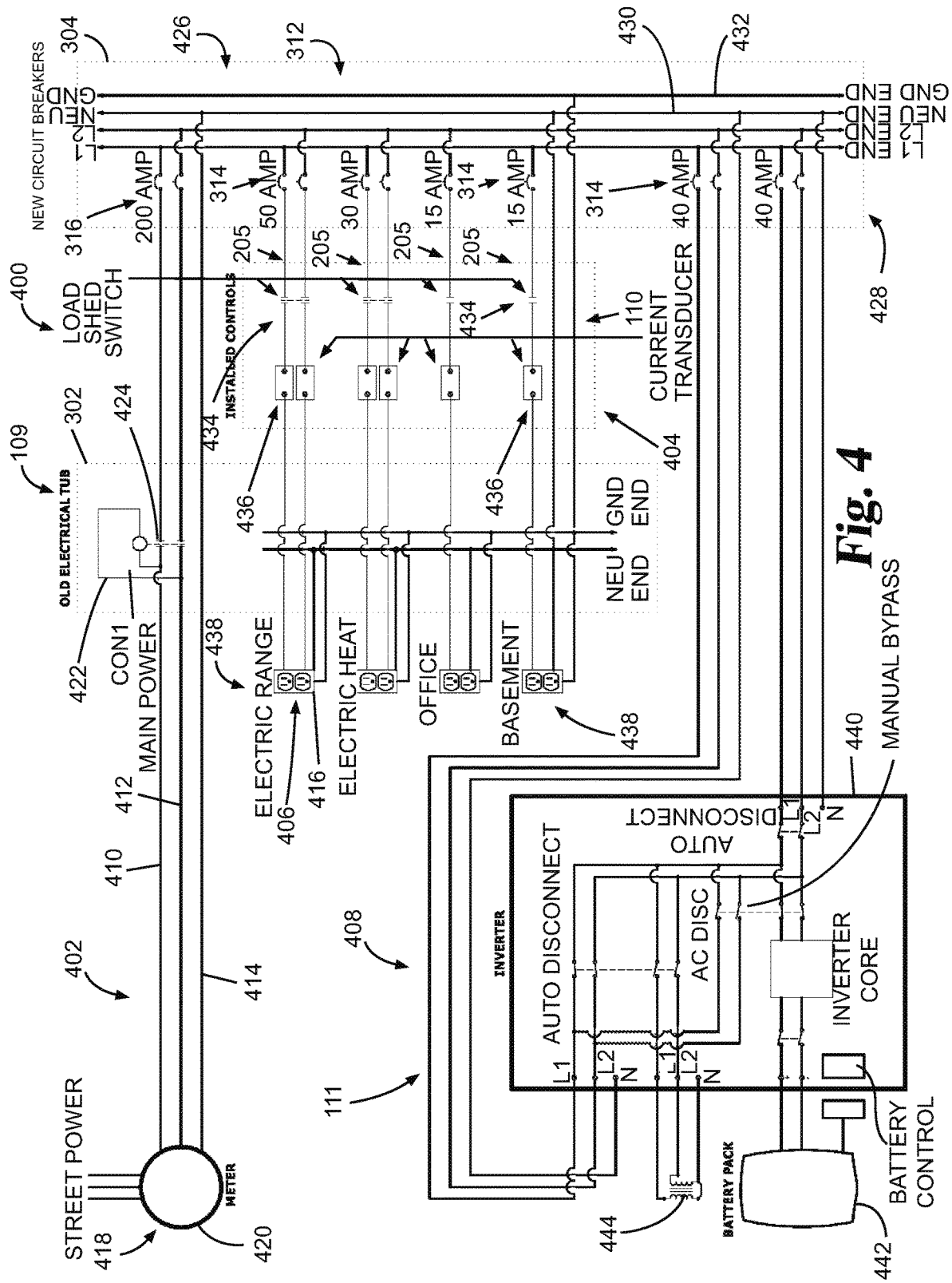
FIG. 4 is a schematic of the electrical connections for the FIG. 1 system.

FIG. 4 shows an electrical schematic of one example of an electrical power distribution system 400 that can be controlled and/or monitored with the service panel system 100. The illustrated electrical system 400 is designed for residential use, but again, it should be recognized the features of the system 400 can be adapted for commercial use. The system 400 in FIG. 4 can be subdivided into four (4) primary sections, a main (utility) power supply section 402, a power control section 404, a circuit or load section 406, and an auxiliary power section 408. The components of these sections are interconnected via first 410 and second 412 load (hot) wires as well as neutral 414 and ground wires 416.

In the main power supply section 402, electrical power is supplied via a utility or street (main) power source 418 to an electrical meter 420. The main power supply section 402 includes the main power control module 109 (FIG. 1). In the illustrated example, the main power control module 109 includes a main power disconnect 422. Power from the electrical meter 420 is routed to the main power disconnect 422 in the power control section 404. The main power disconnect 422 is one type of main power control module 109 that is operatively connected to the controller 108. In one form, the main power disconnect 422 includes a 200 amp rated contact, but other types of disconnects or contact switches can be used. As depicted, the main power disconnect 422 is located inside the base service panel enclosure 302 so as to provide protection from electrical shock. The main power disconnect 422 is connected to the load wires 410, 412 so that the controller 108 is able to cut off the main power to the rest of the system 400 so as to island the rest of the system 400 from the main power supply from the utility. This disconnection by the main power disconnect 422 occurs without tripping the main breaker 316 (or other circuit breakers 314) so as to allow the main power to be rapidly restored by the main power disconnect 422. This disconnection can occur due to a number of circumstances. For instance, this anti-islanding protection can occur to protect utility workers when the auxiliary power section 408 powers the system 400 and/or when power outages occur. Consequently, conventional manual main circuit breakers can be readily used in the service panel system 300, but the overall system 100 is still able to provide remote control of the circuits.

As shown in FIG. 4, the main power disconnect 422 taps into the load wires 410, 412 facing the power supply section 402, which is upstream from main power disconnect switches 424 that are configured to disconnect the load wires 410, 412. With this configuration, the controller 108 via an electric transducer or other sensor in the main power control module 109 is then able to monitor voltage and/or current supplied from the main power supply section 402 (i.e., the electrical grid) to determine if there has been a power failure or if electrical service from the utility has been restored, among other things.

As can be seen, the load wires 410, 412 from the main power disconnect 422 are connected to the main breaker 316. As noted before, the system 100 is configured to facilitate the use of standard or conventional circuit breakers, such as the main breaker 316 (if so desired). The extension enclosure 304 houses the circuit breaker assembly 312 that includes a series of bus bars 426. The bus bars 426 are configured in a standard or conventional manner, depending on the local code requirements. The illustrated standard configuration is in accordance with the North American standard configuration for circuit breaker boxes, but it should be recognized that other configurations, such as found in Asia, Australia, the United Kingdom, and Europe, can be used. The bus bars 426 include hot bus bars 428 that are connected to the main breaker 316. In addition, the bus bars 426 include neutral 430 and ground 432 bus bars to which the neutral 414 and ground 416 wires are respectively connected. Looking at FIG. 4, the circuit breakers 314 of the circuit breaker assembly 312 are connected to the hot bus bars 428 in a standard manner (i.e., according to code). As shown, the circuit breakers 314 can for example include single-pole or double-pole circuit breakers.

To power the load section 406, the circuit breakers 314 are electrically connected to respective terminals 205 on the circuit control modules 110. Considering the auxiliary power section 408 is able to control its operation, the circuit breakers 314 for the auxiliary power section 408 are directly connected to the section 408 without the circuit control modules 110. In other examples, one or more of the circuit control modules 110 can be connected between the bus bars 426 and the auxiliary power section 408. Similarly, the power supply 114 (FIG. 1) in one form can be directly connected to one or more of the circuit breakers 314 without one of the circuit control modules 110. Alternatively or additionally, the power supply 114 in other variations is connected to one of the circuits in the load section 406 regulated by at least one of the circuit control modules 110 and/or the auxiliary power section 408. The terminals 205 of the circuit control module 110 each include one or more load shed switches 434 and one or more current transducers 436 that are electrically connected between the circuit breakers 314 and electrical circuits 438 in the load section 406. The load shed switches 434 allow the control modules 110 to individually disconnect and reconnect circuits 438 without the need for tripping (i.e., opening) the circuit breakers 314. This configuration provides redundancy in protection for shorts and/or power spikes which in turn provides additional safety and operational flexibility. Moreover, it allows conventional manual circuit breakers to be used in a remote circuit control environment. The current transducers 436 are configured to allow the control modules 110 to monitor the current in their respective circuits 438. In one example, the control modules 110 are mounted between the base enclosure 302 and the extension enclosure 304, but in other examples, the circuit control modules 110 can be mounted in the base enclosure 302, the extension enclosure 304, or in some combination thereof (or even elsewhere).

As noted before, the auxiliary power section 408 can provide power to the circuits 438 in case of an electrical service disruption, to reduce energy costs, load shedding, and/or for other situations. In the illustrated example, the auxiliary power control module 111 is in the form of an inverter 440 that monitors and/or controls a battery pack 442. As shown, the inverter 440, the battery pack 442, and a transformer 444 are electrically connected together. The controller 108 via the inverter 440 is able to control the charging and discharging of the battery pack 442 as well as monitor the status of the battery pack 442 to, among other things, determine its charge level, operational state, status, etc. In one example, the inverter 440 includes a SUNNY BOY® brand solar inverter provided by SAM America, LLC, and the battery pack 442 includes a POWERWALL brand battery storage system provided by Tesla Motors, Inc. Alternatively or additionally, the battery pack 442 can be part of an electric vehicle (EV) that provides power to the circuits 438 through the inverter 440 and is also charged. During normal operation, the controller 108 instructs the inverter to charge the battery pack 442 when the power of the battery pack 442 is below a specified level (e.g., below 100%, 80%, etc. charge). When an outage occurs, the controller 108 via the inverter 440 supplies electrical energy from the battery pack 442 to one or more of the desired circuits 438. It should be recognized that the inverter 440 can be connected to other local electrical power sources, such as solar panels, wind turbines, and/or generators, to name just a few examples.

Figure 5:
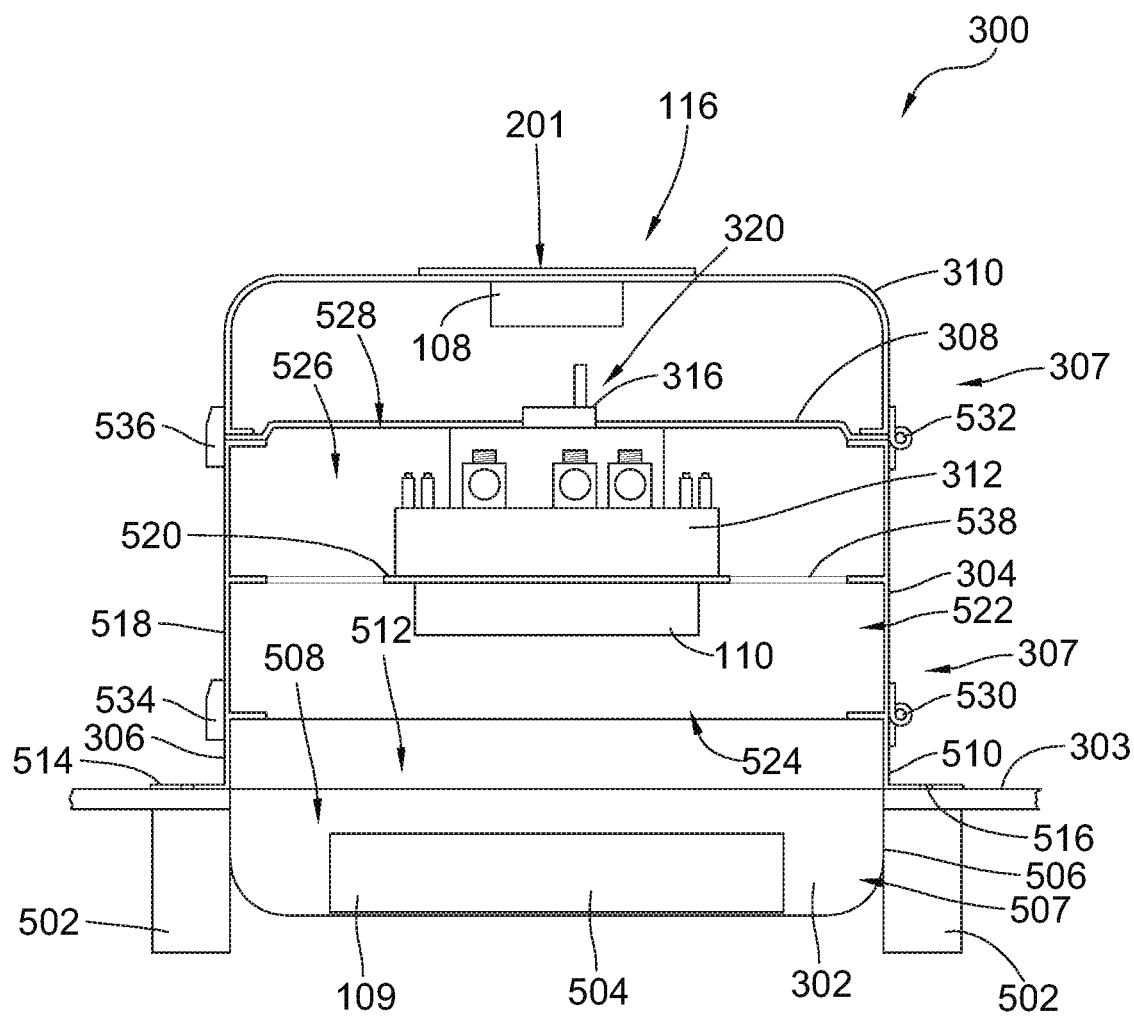
FIG. 5 is a cross-sectional view of the FIG. 3 service panel when installed.
Figure 6:
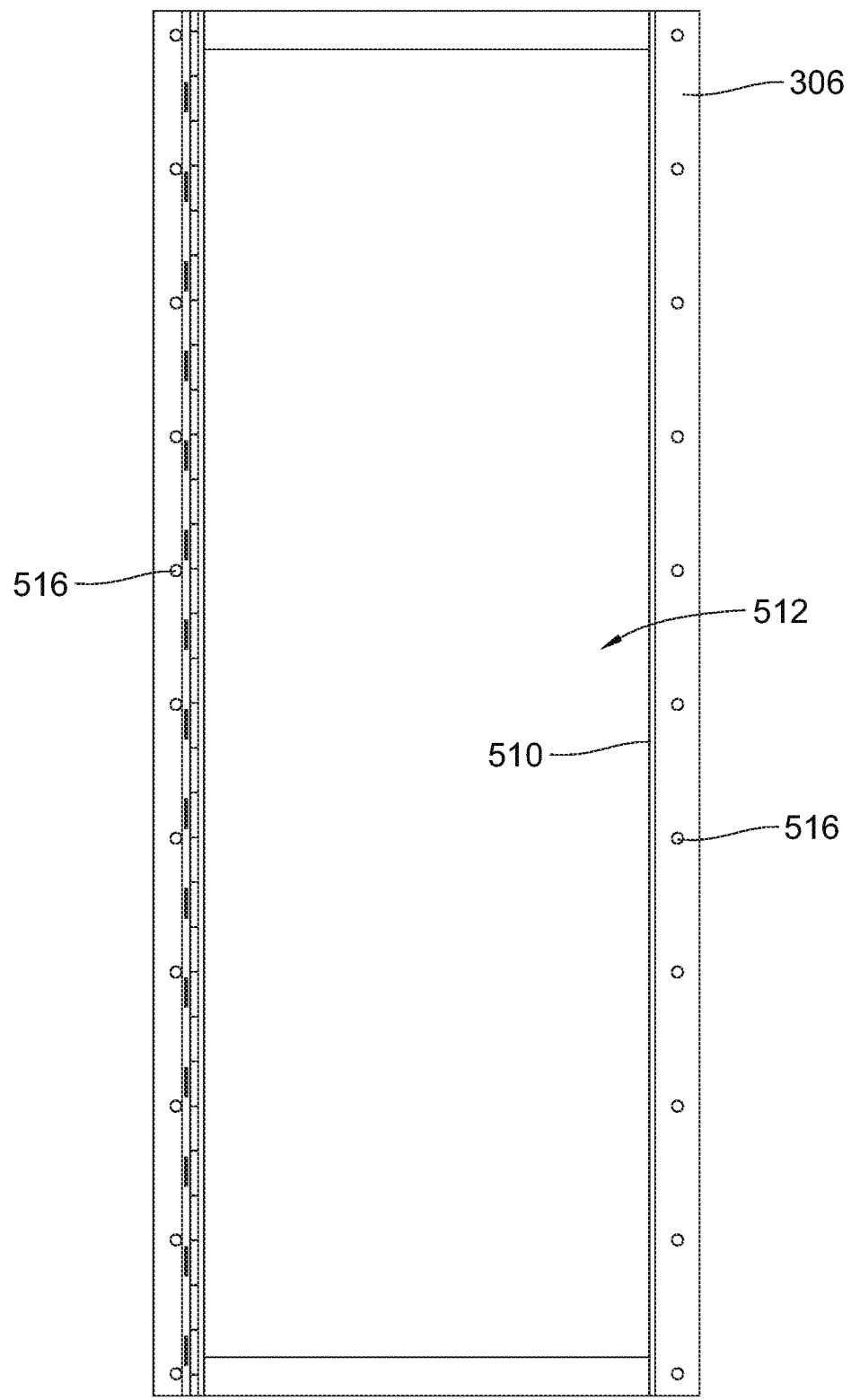
FIG. 6 is a front view of a tub adapter used in the FIG. 3 service panel to connect an extension tub/enclosure to a base tub/enclosure.

FIGS. 5-10 illustrate the layout of one example of the service panel 300. The illustrated layout can apply to both retrofitting to existing power distribution panels as well as new construction. For the sake of brevity, it will be described with respect to retrofitting to a preexisting service panel, but it should be appreciated that this layout can be used for new construction as well. FIG. 5 shows a top end cross-sectional view of the service panel 300. As depicted, the preexisting tub or base enclosure 302 is secured in the wall 303 between two opposing studs 502. The base enclosure 302 has a rear mounting wall 504 that is surrounded by sidewalls 506. The mounting wall 504 along with the sidewalls 506 form a base compartment 507 with and access opening 508. As depicted, the main power control module 109 is mounted to the mounting wall 504 inside the base compartment 507 of the base enclosure 302.

In the illustrated example, the adapter 306 generally has the same size and shape as the access opening 508 of the base enclosure 302, but in other examples, the adapter 306 can have a different size and/or shape. The adapter 306 has an adapter wall 510 that defines an adapter opening 512 that generally matches the access opening 508 of the base enclosure 302. Looking at FIGS. 5 and 6, a mounting flange 514 extends from the adapter wall 510. The mounting flange 514 has one or more fastener openings 516 used to secure the adapter 306 to the wall 303. In one example, screws are screwed into the wall 303 via the fastener openings 516 so as to secure the adapter 306 to the studs 502 that bookend opposite sides of the base enclosure 302. However, it should be recognized that the adapter 306 can be secured in other ways. For example, the adapter 306 can be secured directly to the base enclosure 302 via screws, other types of fasteners, and/or via adhesives. In another variation, the extension enclosure 304 is directly secured to the base enclosure 302 without the adapter 306.

Turning back to the illustrated example, the extension enclosure 304 includes a sidewall 518 that generally aligns and matches with the adapter wall 510 of the adapter 306. A mounting wall 520 is disposed inside the extension enclosure 304. The mounting wall 520 along with the sidewall 518 form a base facing cavity 522 that has a base facing opening 524 that opens towards the base enclosure 302. On the side of the mounting wall 520 that is opposite to the base facing cavity 522, the extension enclosure 304 has an access panel cavity 526 with an access panel opening 528 that is enclosed by the access panel 308.

Figure 7:
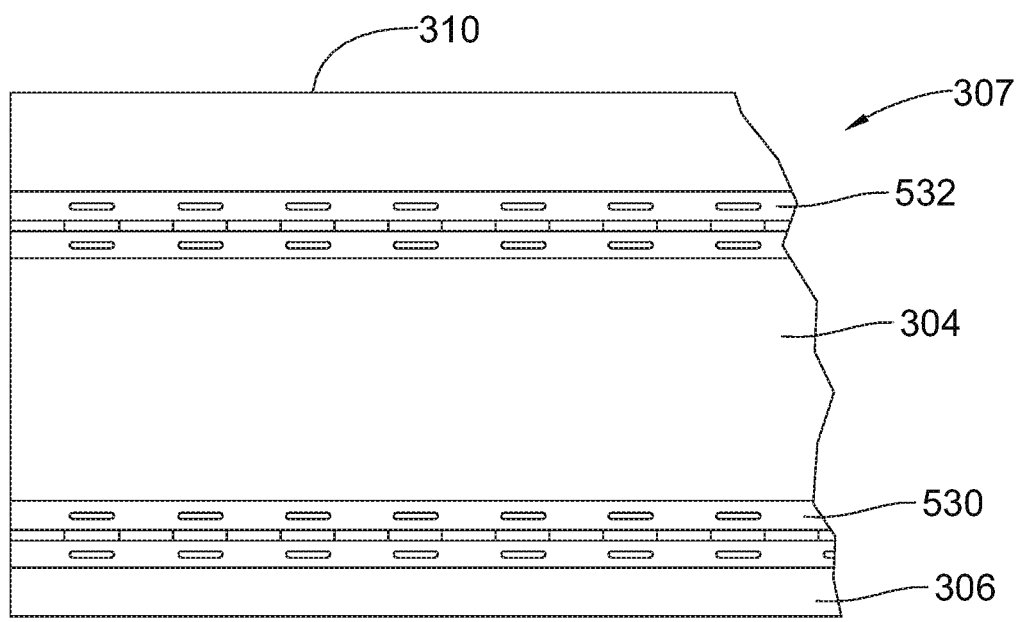
FIG. 7 is an enlarged view of the hinge type connections found in the FIG. 3 service panel.

As can be seen in FIGS. 5 and 7, the hinge system 307 secures together the adapter 306, the extension enclosure 304, the breaker access door 308, and the outer cover 310 in a hinged manner so as to facilitate access to the various components and/or compartments of the service panel 300. The hinge system 307 includes an adapter hinge 530 that secures the extension enclosure 304 to the adapter 306 in a hinged manner. The hinge system 307 further includes an extension or cover hinge 532 that secures the outer cover 310 and the breaker access door 308 to the extension enclosure 304 in a hinged manner. In the illustrated example, the extension hinge 532 is a double type hinge that allows both the breaker access door 308 and the outer cover 310 to open and close. An extension latch 534, which is located generally on the side opposite the adapter hinge 530, is configured to latch the extension enclosure 304 in a closed position with the adapter 306. A cover latch 536 is configured to latch or secure on a temporary or semi-permanent basis the cover 310 as well as the breaker access door 308 in a closed position to the extension enclosure 304. In another example, a separate latch is used to secure the breaker access door 308 in a closed position. Such a configuration of the hinge system 307 and the latches 534, 536 allow the service panel 300 to be readily locked closed, and if needed for service or repair, opened so as to provide access to the various components and compartments of the service panel 300. The mounting wall 520 of the extension enclosure 304 has one or more wire openings 538 so as to allow wires to run through the mounting wall 520.

Figure 8:
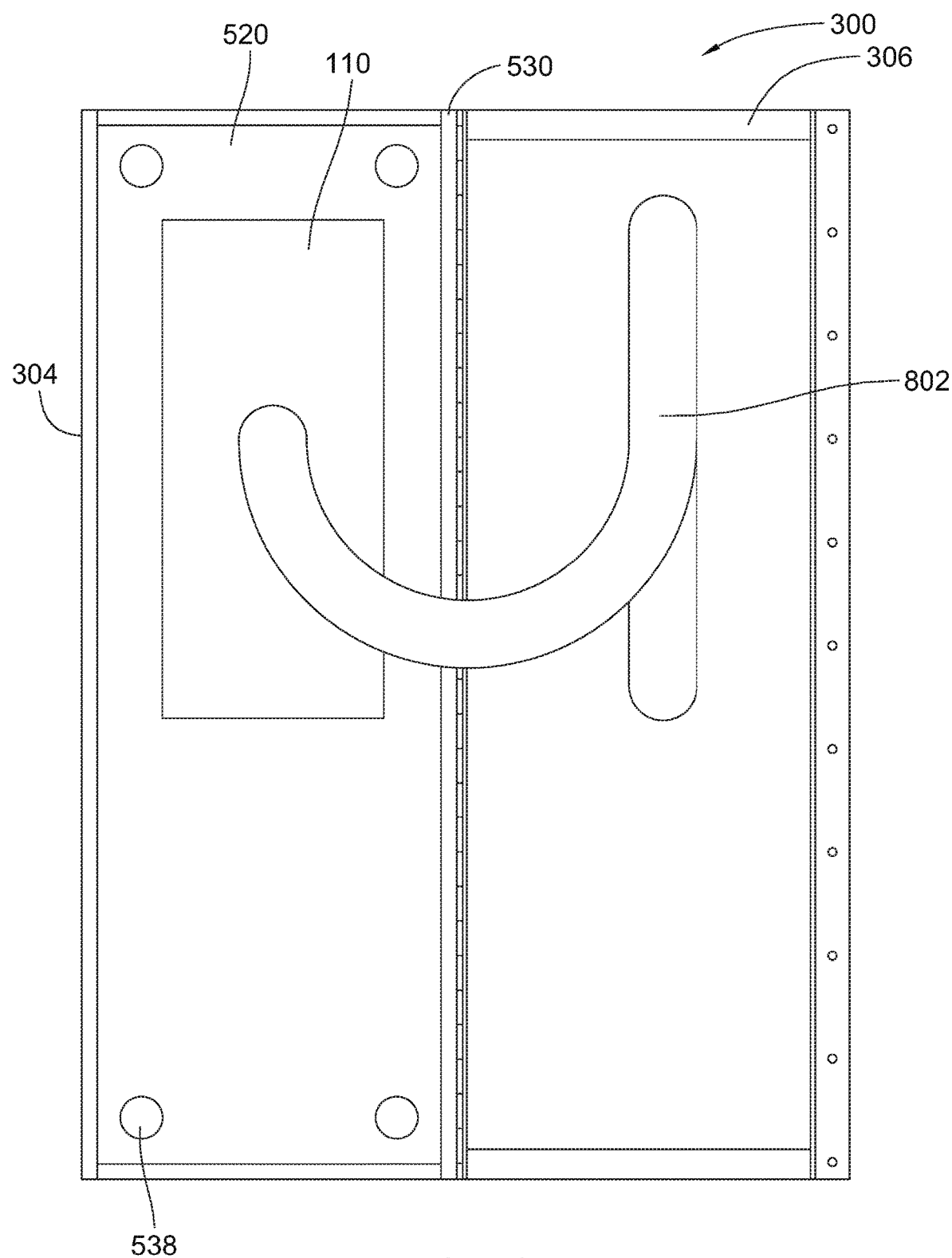
FIG. 8 is a front view of the FIG. 3 service panel with the extension tub oriented at an open position relative to the adapter.

The circuit control module 110 is mounted inside the base facing cavity 522 of the extension enclosure 304. In particular, the circuit control modules 110 are mounted to the mounting wall 520 so as to generally face the main power circuit control module 109. This configuration helps with wiring in the circuit control modules 110 and the circuit breaker assembly 312 to existing wiring. Referring to FIG. 8, the service panel system 300 can include a wiring harness 802 that is configured to connect the circuit control modules 110 and the circuit breaker assembly 312 to the existing (or new) circuit wiring in the base service panel enclosure 302. The harness 802 has sufficient length or slack to facilitate opening of the access panel enclosure 304.

Figure 9:
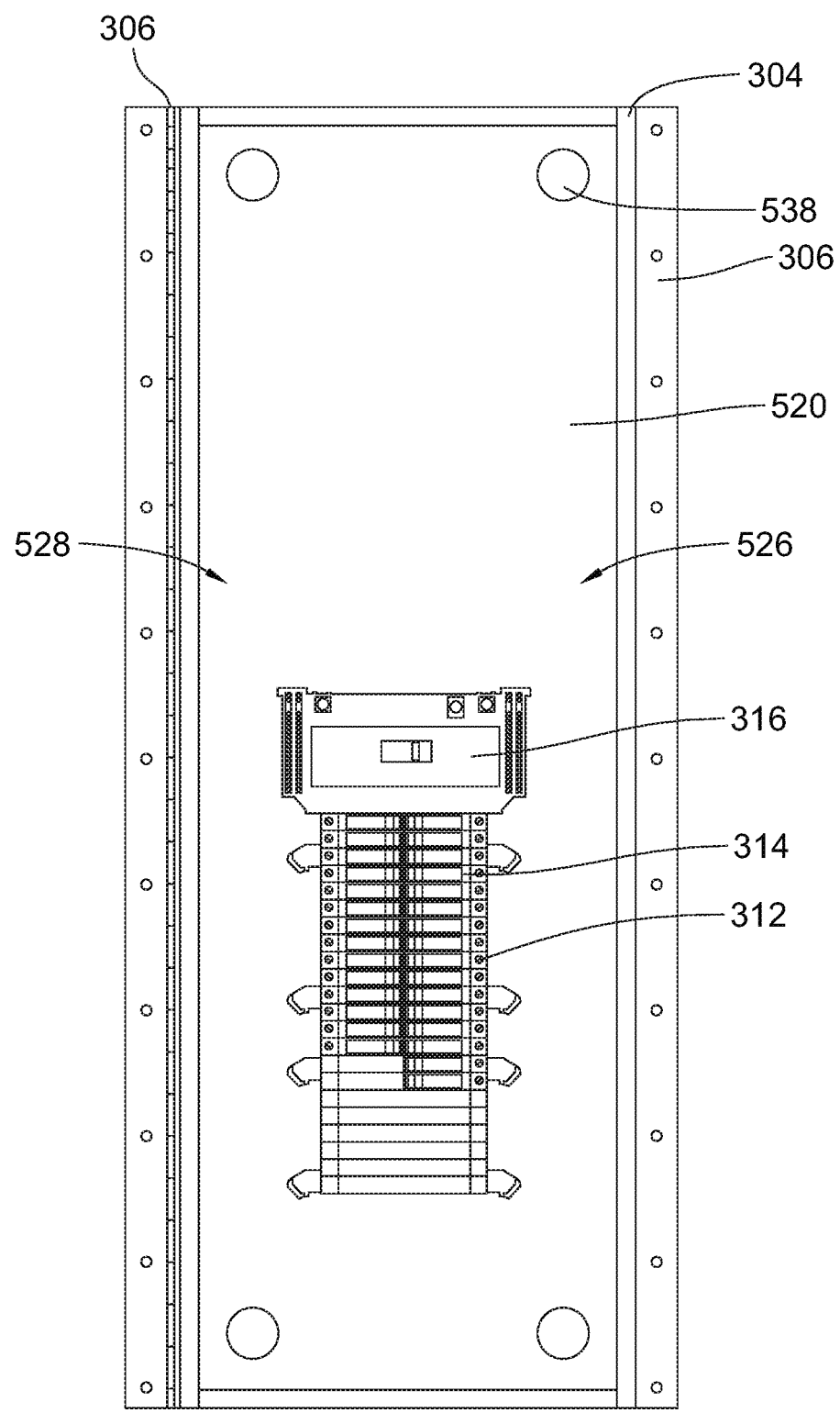
FIG. 9 is a front view of the FIG. 3 service panel showing a circuit breaker assembly mounted to the extension tub.

Referring to FIGS. 5 and 9, the circuit breaker assembly 312 is mounted in the access panel cavity 526 of the extension enclosure 304. As can be seen, the circuit breaker assembly 312 is generally mounted to the mounting wall 520 on the side opposite to the circuit control modules 110. The distance for wiring between the circuit breaker assembly 312 and the circuit control modules 110 is relatively short. This configuration also facilitates easy retrofitting to preexisting installations. The individual circuit breakers 314 can be prewired to the respective terminals 205 of the circuit control modules 110, as should be appreciated by looking at FIGS. 4, 5, and 9. This in turn helps simplify installation. During installation, the load wires 410, 412 from the main power disconnect 422 are run to the main breaker 316. With the circuit breakers 314 prewired to the terminals 205 of the circuit control modules 110 and the harness 802 wired to the terminals of the circuit control modules 110, the preexisting wiring can be readily connected to the preexisting wiring of the facility through the harness 802.

Figure 10:
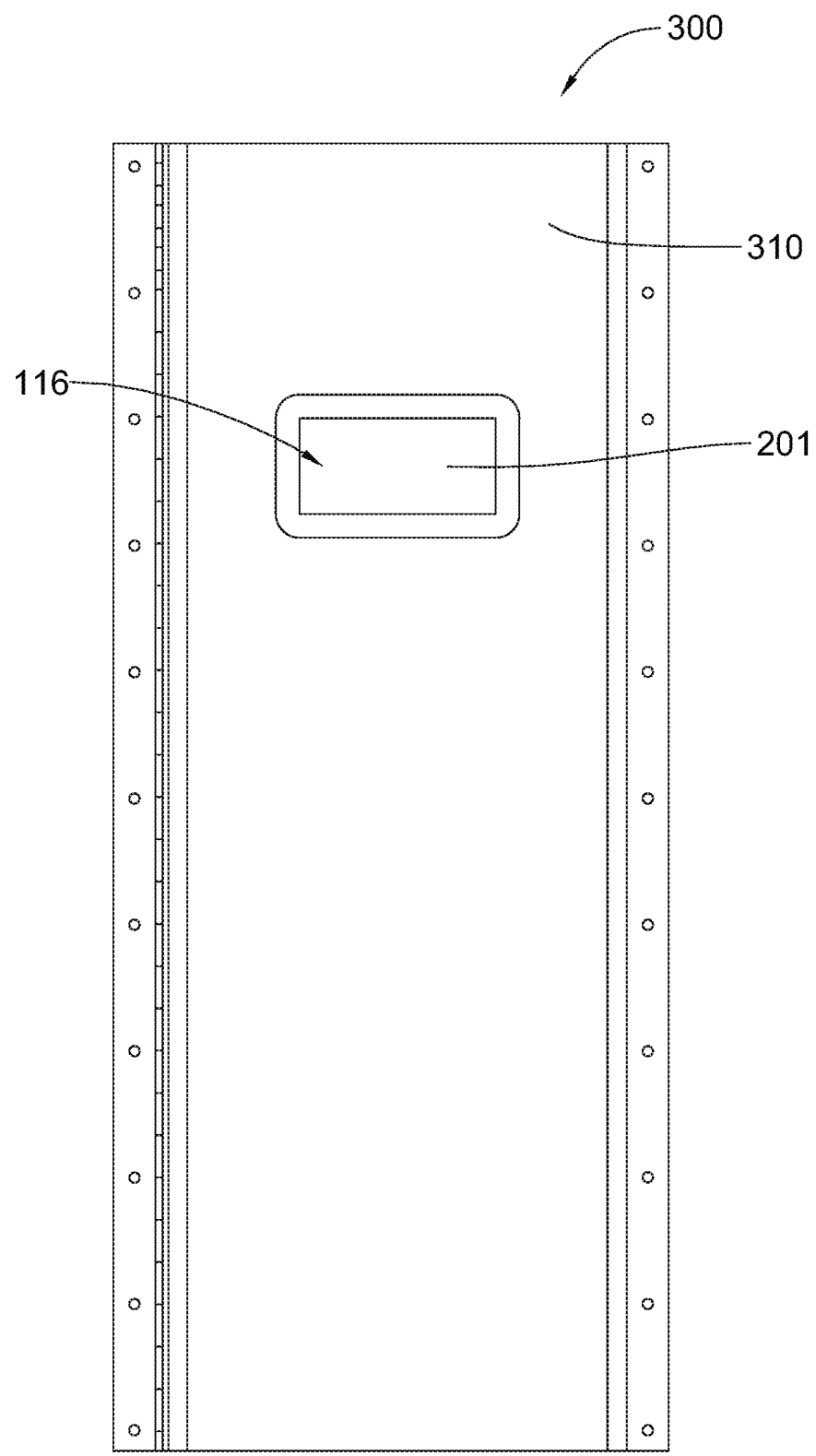
FIG. 10 is a front view of the FIG. 3 service panel when the outer cover is closed.

As illustrated in FIGS. 5 and 10, the touchscreen 201 is mounted to the outside of the cover 310 so as to facilitate user interaction with the touchscreen 201. Inside the cover 310, the controller 108 is mounted to the backside of the touchscreen 201 through an opening in the cover 310. Having the controller 108 mounted to the outer cover 310 helps to facilitate wireless communication from the controller 108 to other systems on the network 106. Moreover, being mounted in such a location also helps to minimize electrical interference that could detrimentally impact the controller 108. Even during power interruptions, the user is still able to interface with the local system 102 through the touchscreen 201.

Figure 11:
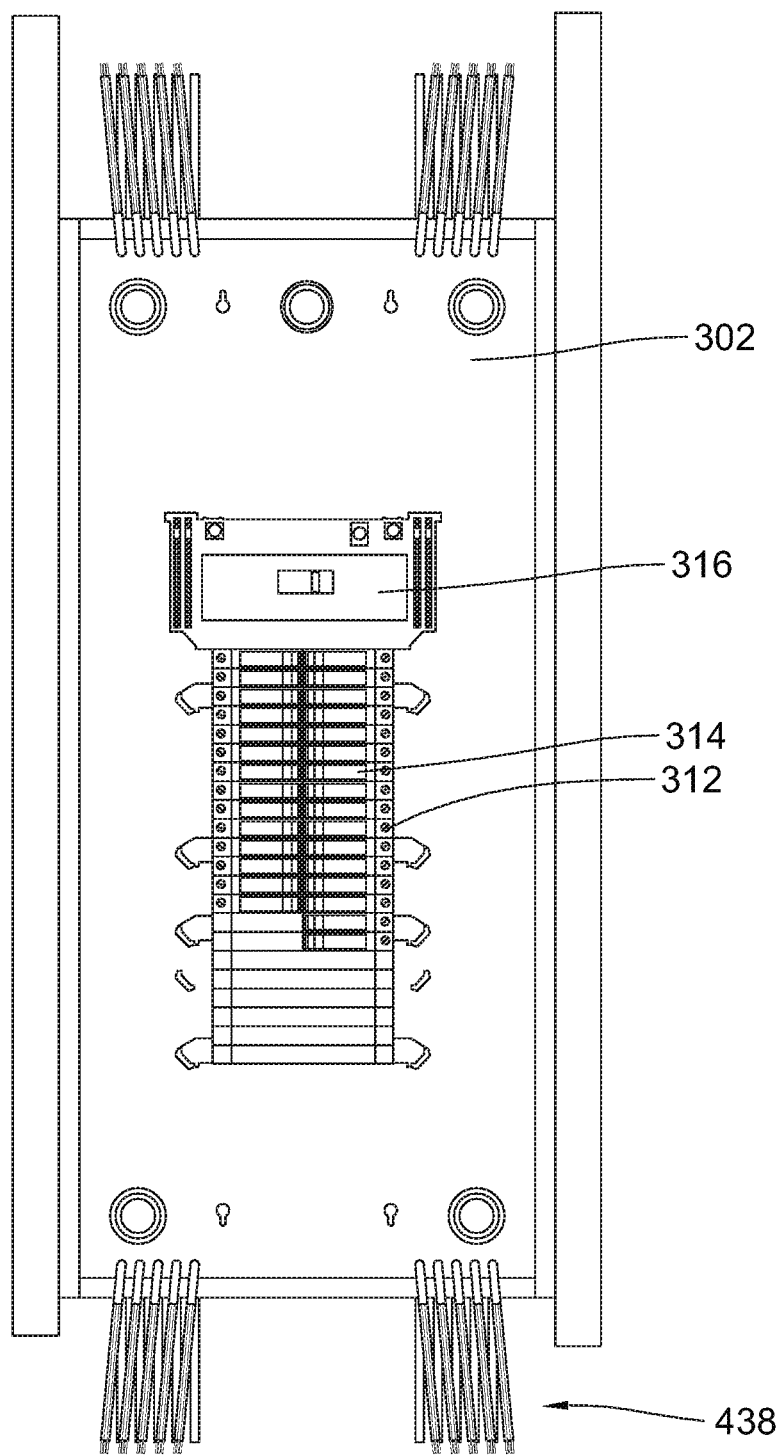
FIG. 11 illustrates a stage of retrofitting the FIG. 3 service panel to a preexisting breaker panel in which the door of the preexisting breaker panel is removed.
Figure 12:
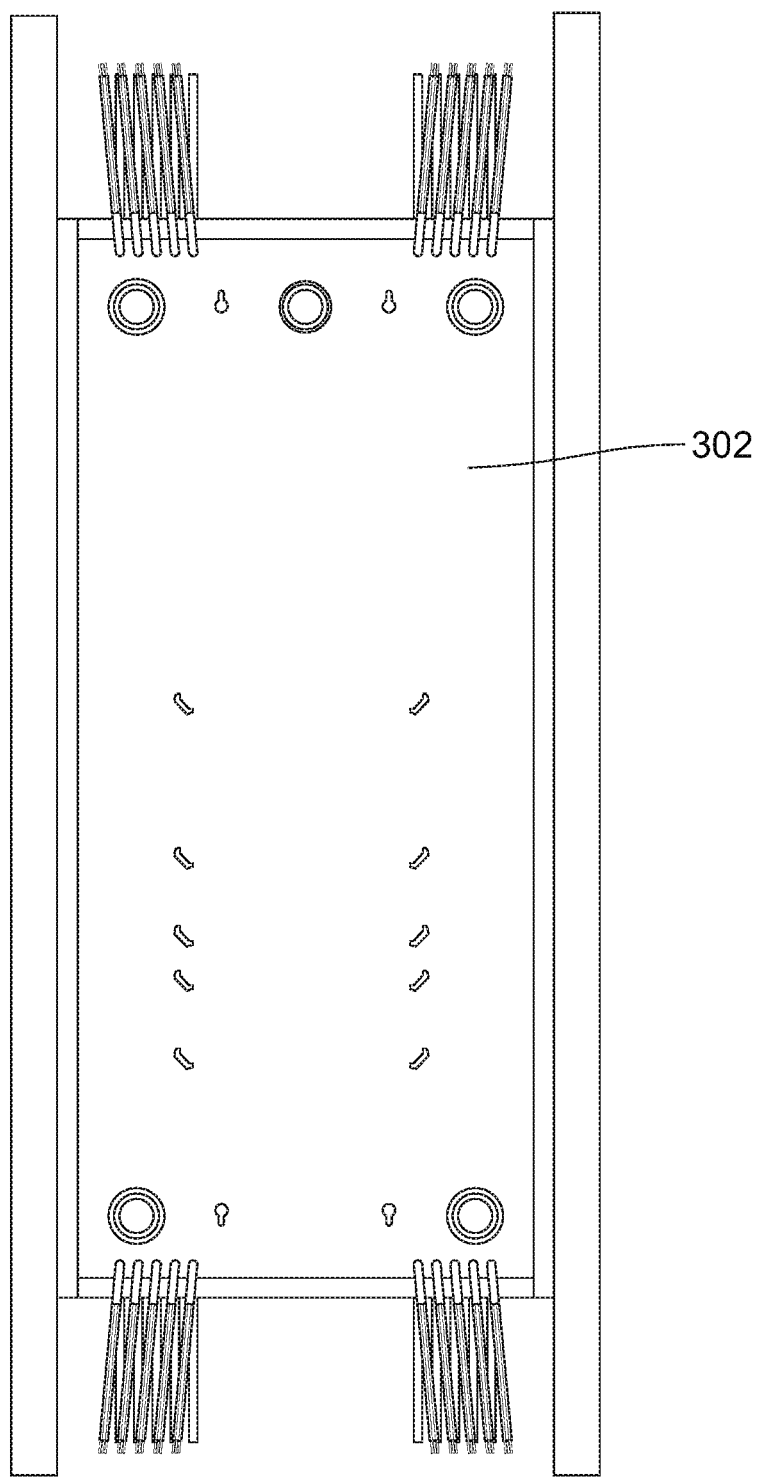
FIG. 12 illustrates a stage for retrofitting the FIG. 3 service panel to the preexisting breaker panel in which the circuit breakers are removed from the base tub.
Figure 13:
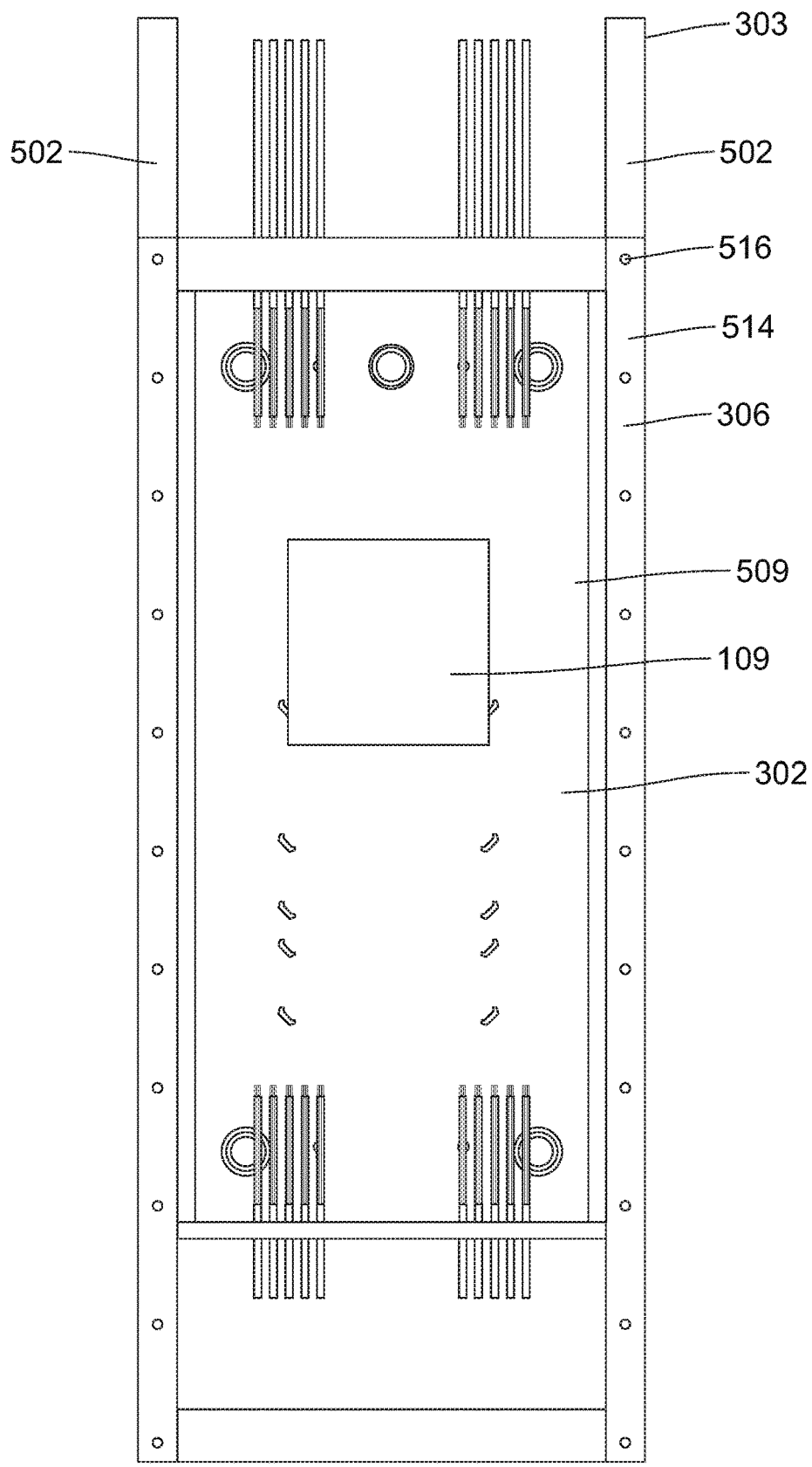
FIG. 13 illustrates a stage for retrofitting the FIG. 3 service panel to the preexisting breaker panel when the adapter is attached to the base tub of the preexisting breaker panel.

The service panel 300 is compact and easy to install to existing power distribution panels as well as in new construction. A technique for retrofitting the service panel 300 to a preexisting circuit breaker panel will now be described with reference to FIGS. 11-18. The technique will be described with respect to retrofitting a main service panel, but it should be recognized that this technique can be applied to auxiliary service panels and/or new construction. During this retrofit process, the panel cover on the existing service panel is first removed (FIG. 11) after the power to it is disconnected. FIG. 11 shows a distribution panel with the circuit breaker assembly 312 received in the preexisting, base service panel enclosure 302. To prepare for the retrofitting, most of the existing contents of the service panel, such as the circuit breakers 314, are removed. Upon labeling and disconnecting each of the circuits 438, the old circuit breakers 314 along with the circuit breaker assembly 312 are removed from the enclosure 302, and the wires inside the enclosure 302 are pulled out of the way. In one form, the existing neutral wires 414 remain attached to the old, existing neutral (and ground) bus within the (old) base service panel enclosure 302. FIG. 12 shows the resulting empty enclosure 302. The main power control module 109 is then installed in the now available space within the base compartment 509 of the enclosure 302, as is depicted in FIG. 13. At this time (or before or later), the load wires 410, 412 from the power supply section 402 are connected to the main power control module 109. In another example, the circuit control modules 110 are installed along with the main power control module 109 inside the base enclosure 302 at positions that generally coincide with that of the original circuit breaker assembly 312. As a result of this orientation, the load wires generally land on the appropriate terminals of the circuit control modules 110 without the need to re-pull wires. The mounting flange 514 of the adapter 306 is also secured to the studs 502 of the wall 303 via screws screwed into the fastener openings 516. As noted before, the adapter 306 can be secured in other ways. In the illustrated example, the adapter 306 is longer than the base enclosure 302 such that the extension enclosure 304 can be larger so as to provide additional room. Again, in other variations, the adapter 306 along with the extension enclosure 304 can have the same general size as the base enclosure 302.

Figure 14:
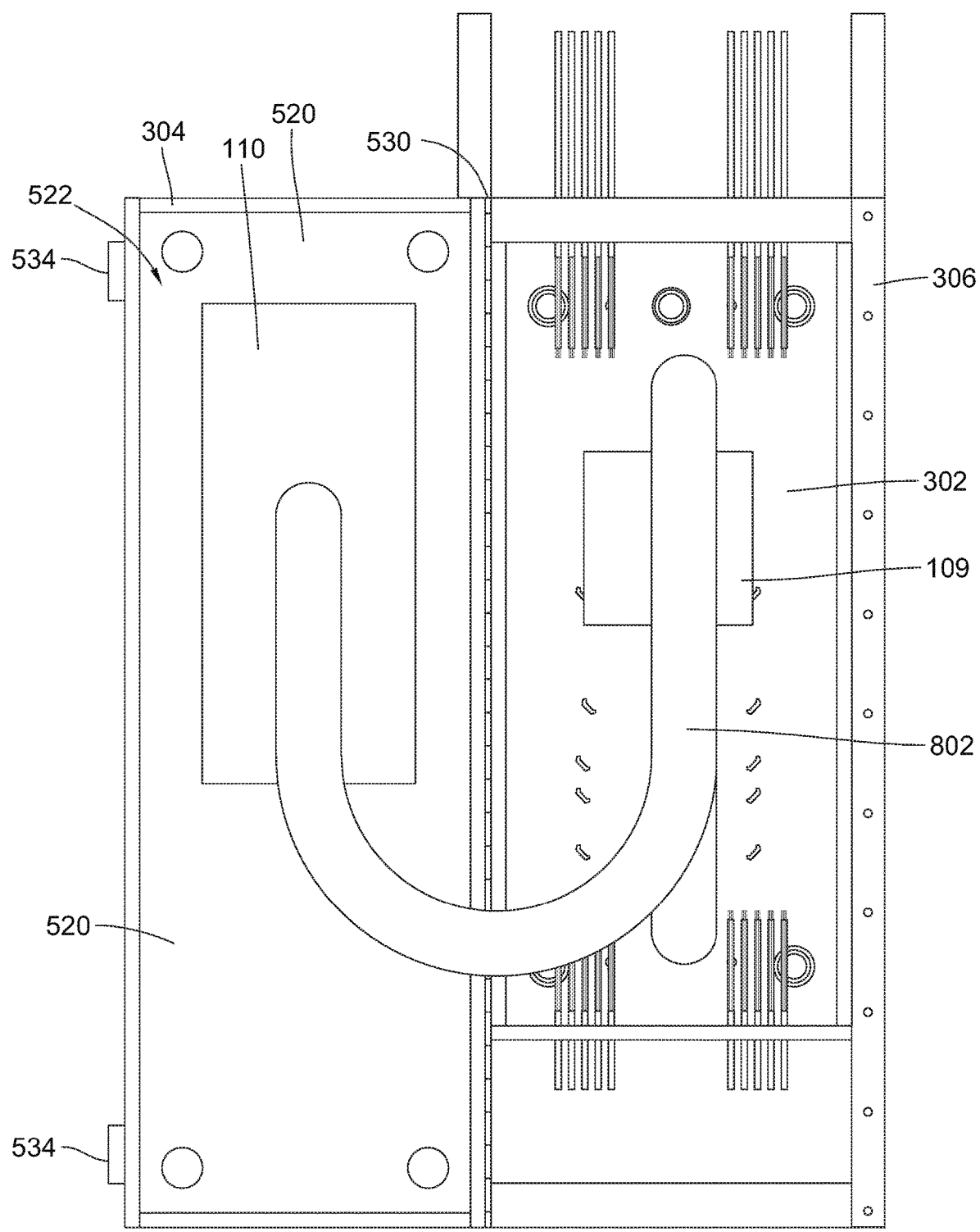
FIG. 14 illustrates a stage for retrofitting the FIG. 3 service panel to the preexisting breaker panel when an extension tub is secured to the base tub via the adapter.

Turning to FIG. 14, the new (extension) enclosure 304 is installed over top of the existing (base) enclosure 302 by hanging the extension enclosure 304 on the adapter hinge 530 of the adapter 306. The adapter hinge 530 facilitates access to the old rough-in enclosure 302 and main power control module 109. As previously described with reference to FIG. 5, one or more circuit control modules 110 are mounted to the mounting wall 520 of the extension enclosure 304. In one form, the circuit control modules 110 and the circuit breaker assembly 312 are pre-mounted on opposing sides of the mounting wall 520 to help simplify on-site assembly because all of the connections between the control modules 110 and the circuit breaker assembly 312 can be made in the factory or pre-wired elsewhere. In another example, the circuit control modules 110 and/or the circuit breaker assembly 312 can be mounted and/or wired on site in the extension enclosure 304. Once the extension enclosure 304 is hung, the wiring harness 802 from the circuit control module 110 is electrically connected to the wiring in the residence or commercial facility. The harness 802 provides additional slack so that the extension enclosure 304 can be fully opened. In another variation, the harness 802 can be partially or fully wired to the local wiring before the extension enclosure 300 is hung. In one form, the old neutral (and ground) bus within the base service panel enclosure 302 is attached to one or more new buses within the extension service panel enclosure via one or more jumper wires. When closed, the extension latches 534 secure the extension enclosure 304 in a closed position relative to the adapter 306.

Figure 15:
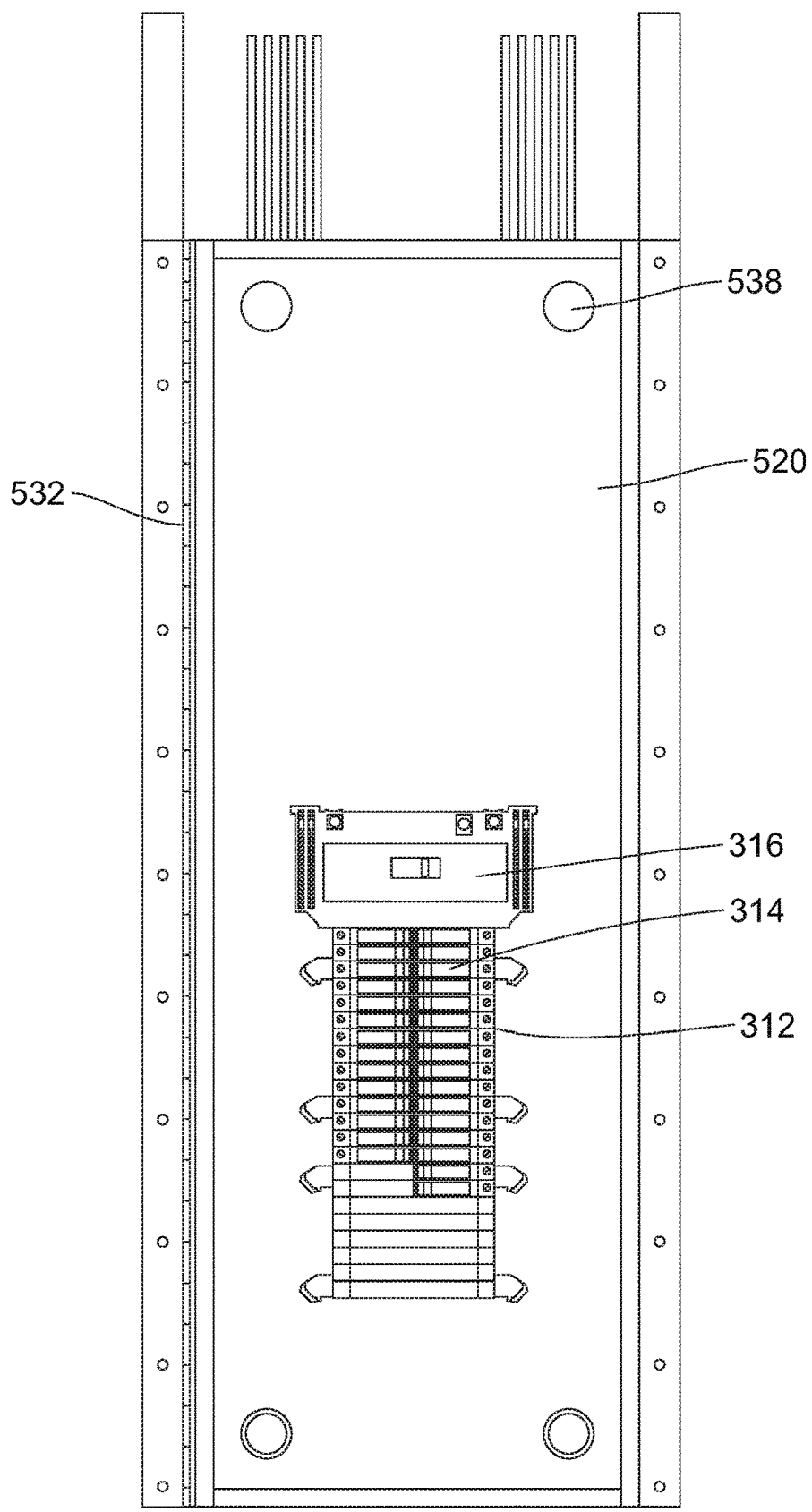
FIG. 15 illustrates a stage for retrofitting the FIG. 3 service panel to the preexisting breaker panel in which the circuit breakers are installed.

FIG. 15 shows the new circuit breaker assemblies 312, which includes the circuit breakers 314 and the main circuit breaker 316, mounted to the mounting wall 520 of the extension enclosure 304. The extension enclosure 304 includes a series of common or standard circuit breakers 314. It does not require the specialized remote control breakers that require individual plug-in type controllers and/or specialized circuit breakers found in other remote power control systems. In another variation, the previous circuit breaker assembly 312 that was shown as being removed in FIG. 11 can be recycled for reuse in the extension enclosure 304. In the illustrated example, the breaker access panel door 308 and the outer cover 310 have been removed from the extension hinge 532 so that the circuit breaker assembly 312 can be easily viewed. When actually installed, the breaker access panel door 308 and the outer cover 310 can remain attached to the extension hinge 532 of the extension enclosure 304, if so desired. Having everything in the service panel 300 installed as a single unit helps to simplify assembly. In another variation, the breaker access panel door 308 and the outer cover 310 can be hung to the extension hinge 532 separately. As shown, the wire openings 538 allow wiring to be routed from the circuit control modules 110 and the main power control module 109 to the circuit breakers 314 and the main circuit breaker 316. The wiring routed through the wiring openings 538 can include the hot 410, 412, neutral 414, ground 416, and/or communication 210 wires. Each circuit from the circuit control modules 110 has terminals 205 that are then wired to the appropriate circuit breaker 314.

Figure 16:
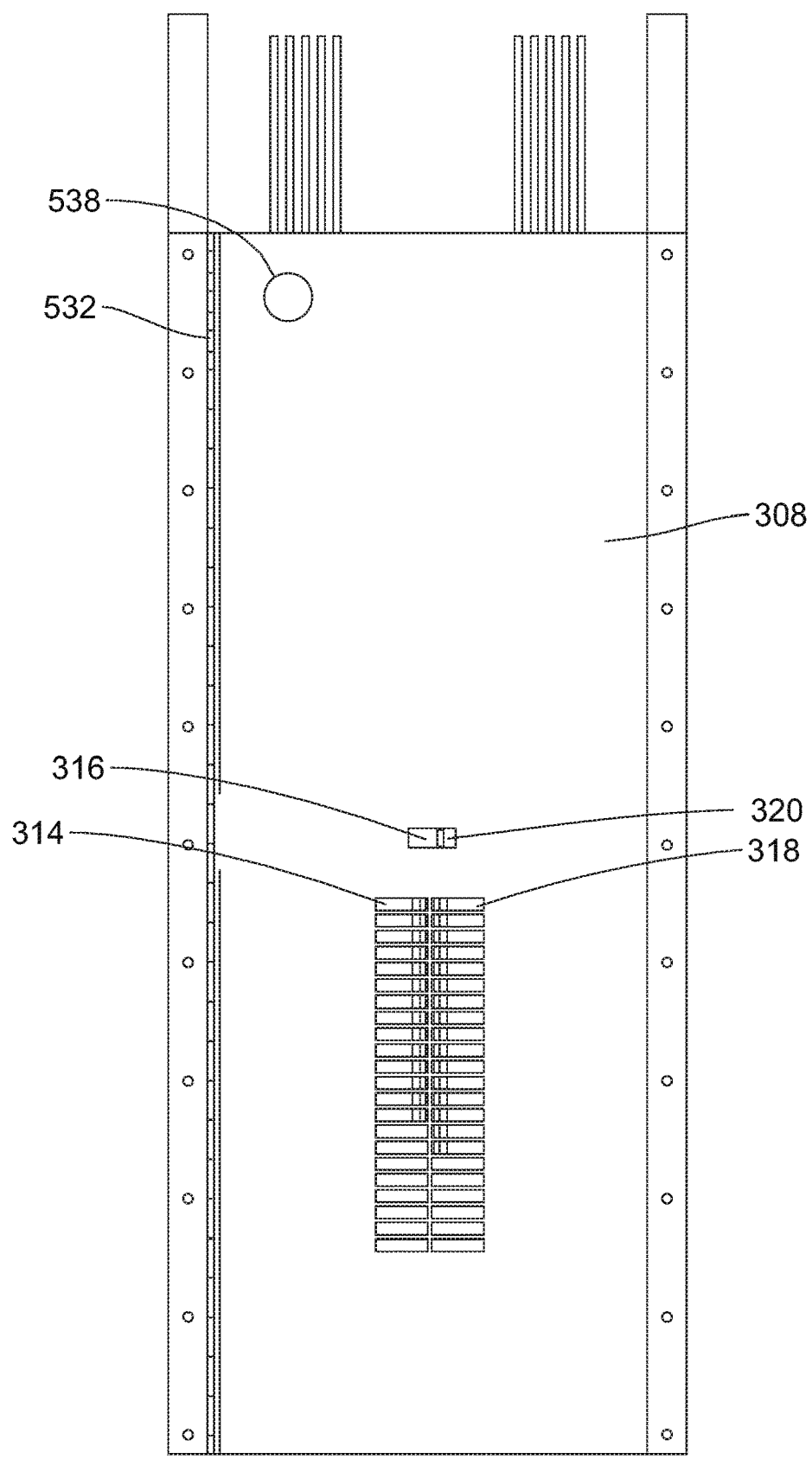
FIG. 16 illustrates a stage for retrofitting the FIG. 3 service panel to the preexisting breaker panel in which a circuit breaker door is installed.
Figure 17:
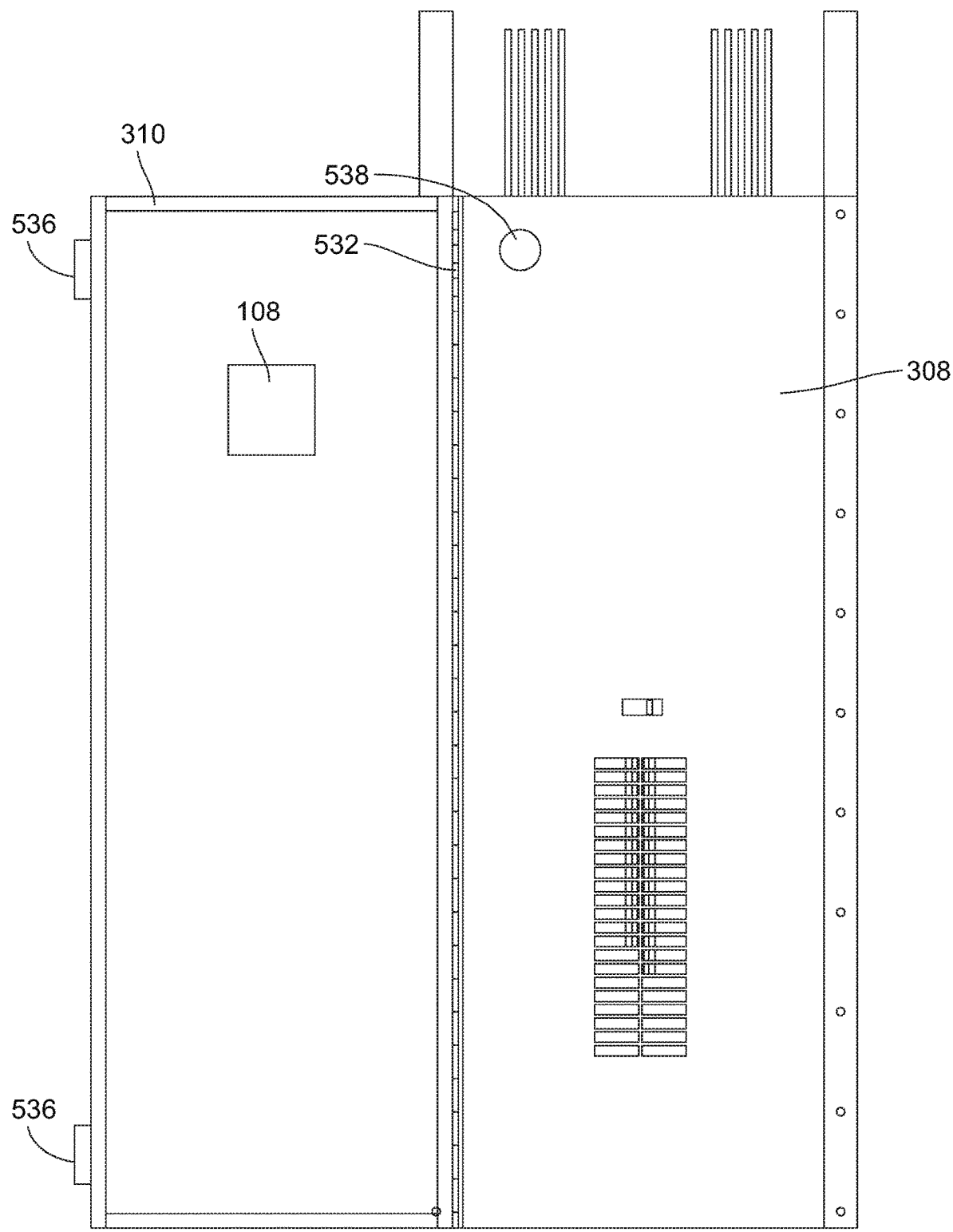
FIG. 17 illustrates a stage for retrofitting the FIG. 3 service panel to the preexisting breaker panel when the outer cover is installed.
Figure 18:
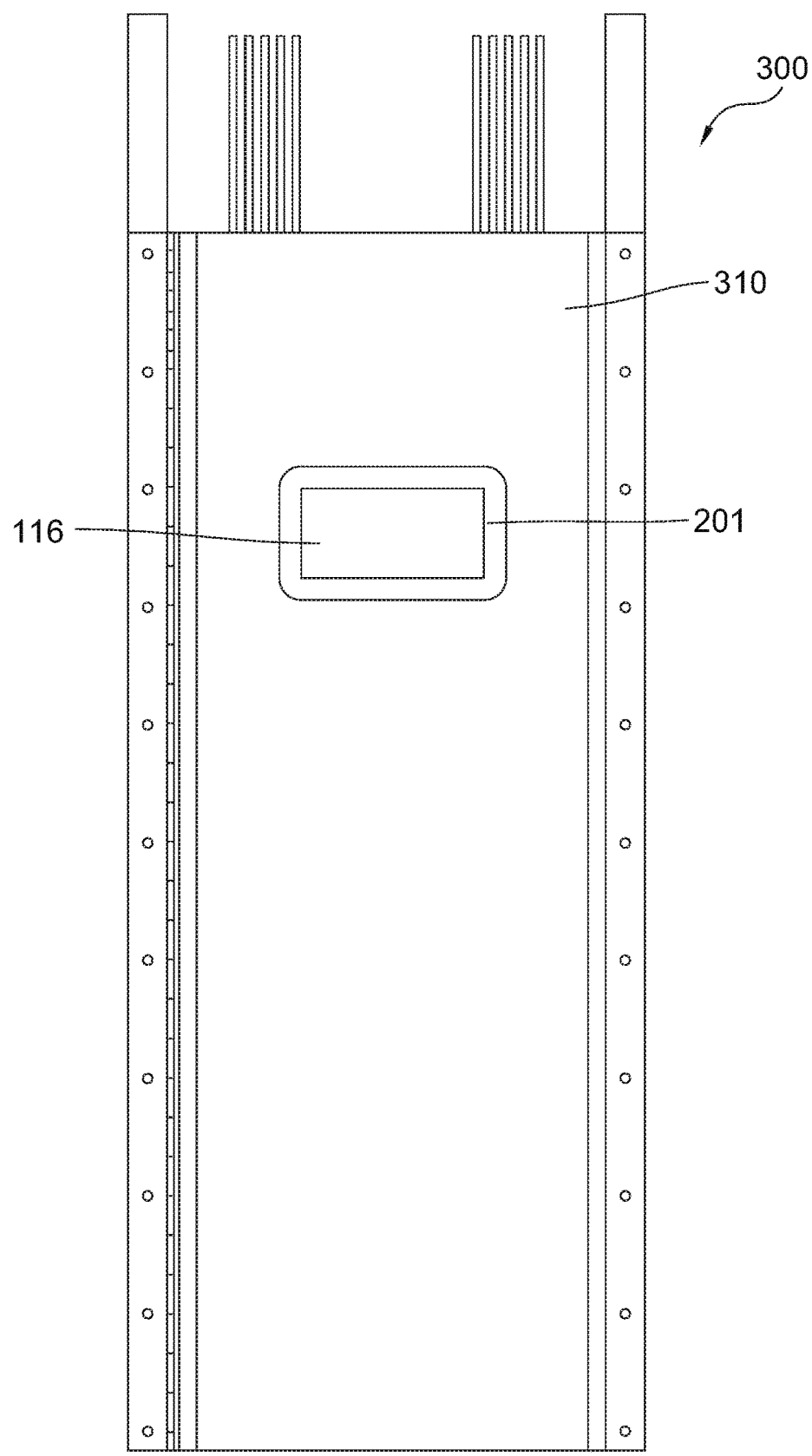
FIG. 18 shows a front view of the FIG. 3 service panel once finally installed.

To cover the wiring, the breaker access panel door 308 is closed in the manner shown in FIG. 16. As can be seen, the circuit breakers 314 and the main breaker 316 are accessible via the circuit breaker opening 318 and the main breaker opening 320. A separate latch mechanism can be used to secure the breaker access door 308. FIG. 17 shows the outer cover 310 mounted to the extension hinge 532 in an open position. As shown, the controller 108 is mounted to the backside of the outer cover 310. The panel door 308 includes one of the wire openings 538 so that the cables 210 or other wiring can be routed from the controller 108 to the other devices. As noted before, the cover latches 536 are used to secure the outer cover 310 in a closed position. Turning to FIG. 18, the outer cover 310 includes the touchscreen display 201 that allows the user to monitor and interface with the system 102. Before, during, or after installation/assembly of the service panel 300, the controller 108, control modules 109, 110, 111, switch 112, and power supply 114 are operatively connected together via the cables 210 in the manner illustrated in FIGS. 1 and 2. The controller 108 in one example is operatively connected to the network 106 via a wireless connection. By installing the power circuit monitoring and control system 100 in this way, circuit level monitoring and control with proper protection can be achieved with very inexpensive installation/retrofit costs.

As should be recognized, the electrical distribution control and monitoring system 100 is also designed to be easily installed into new installations. The new, base service panel enclosure 302 is installed into the wall 303 in the same manner as conventional main distribution panels are installed. The rest of the components of the service panel 300 are installed in a similar fashion to that described above with reference to FIGS. 12-18, and for the sake of brevity, these common steps will not be discussed in detail again but reference is made to the previous discussion. With the exception of the removal of the old circuit breaker assembly 312, which was described with reference to FIG. 11, the rest of the installation is finished as though it were a retrofit installation of the type described above.

Figure 19:
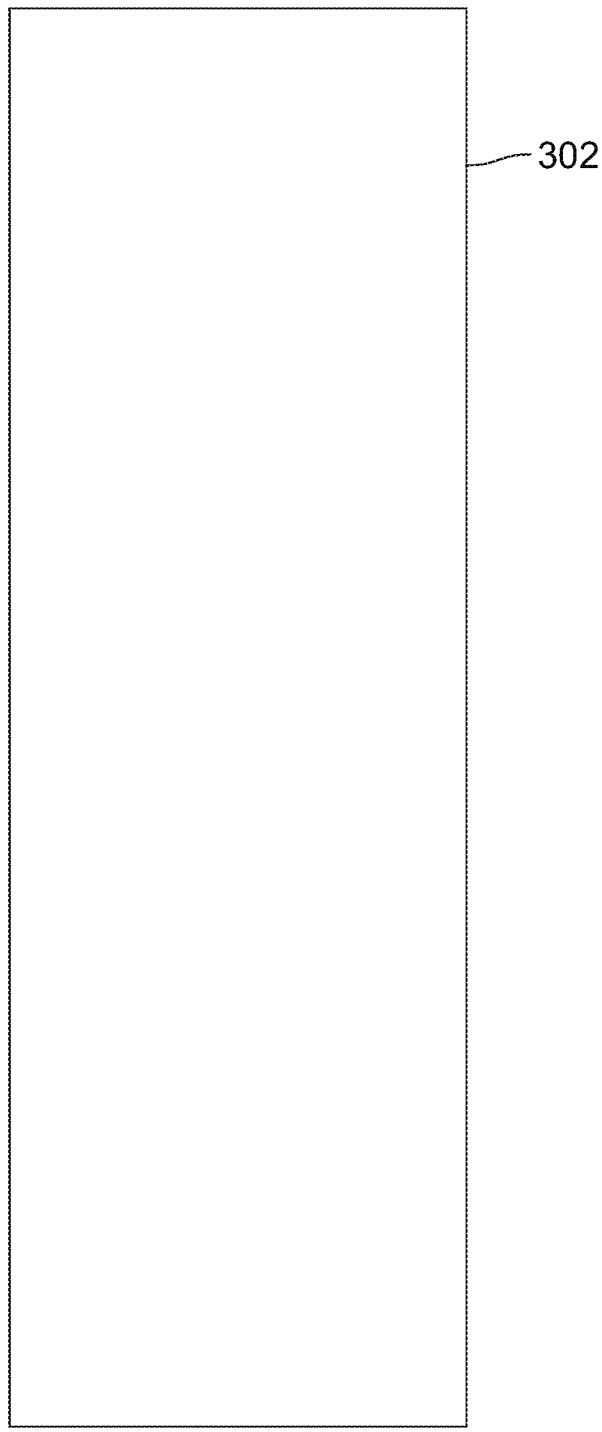
FIG. 19 shows a front view of a base service panel enclosure.
Figure 20:
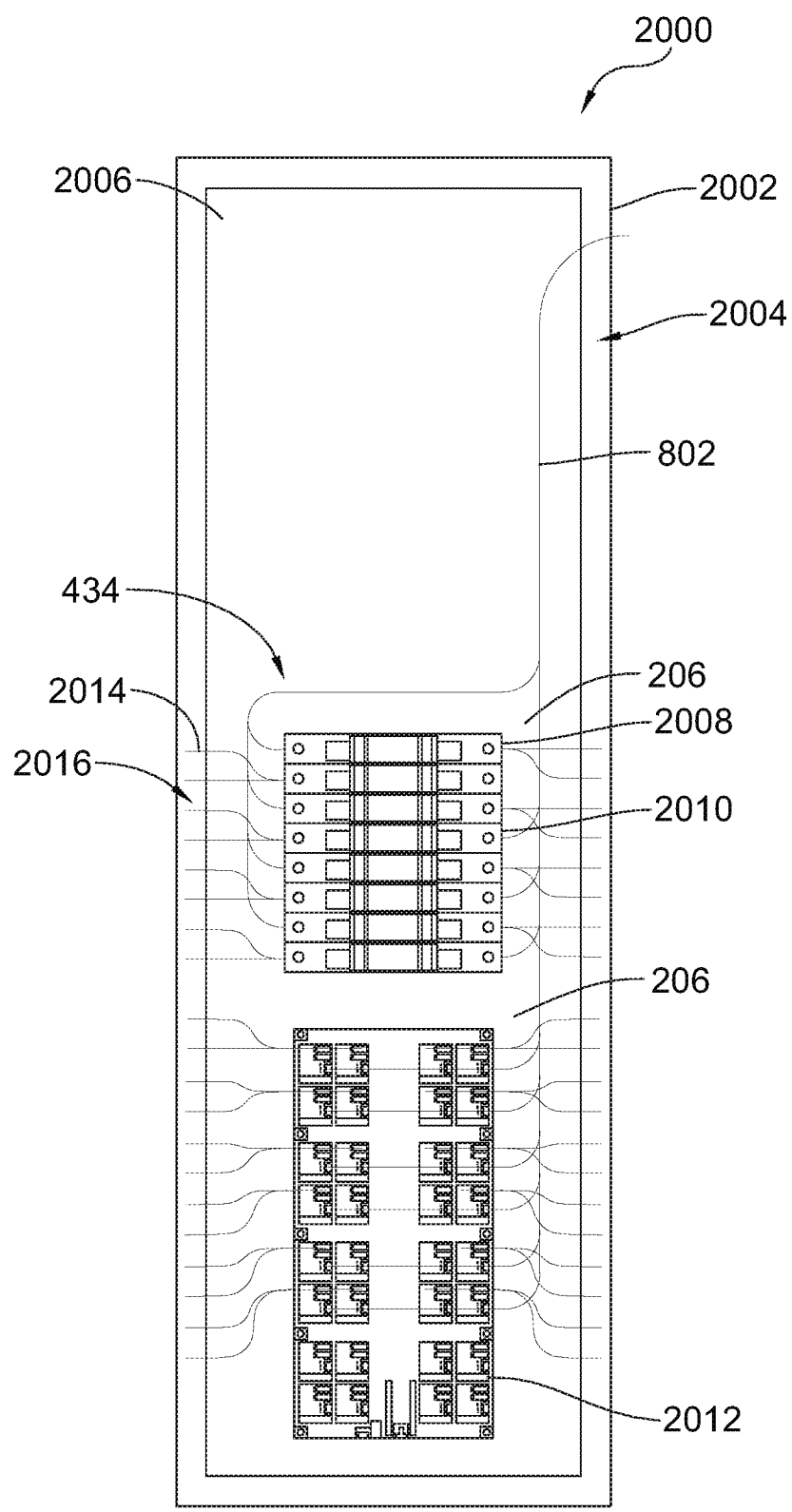
FIG. 20 shows a back view of a portion of a service panel.
Figure 21:
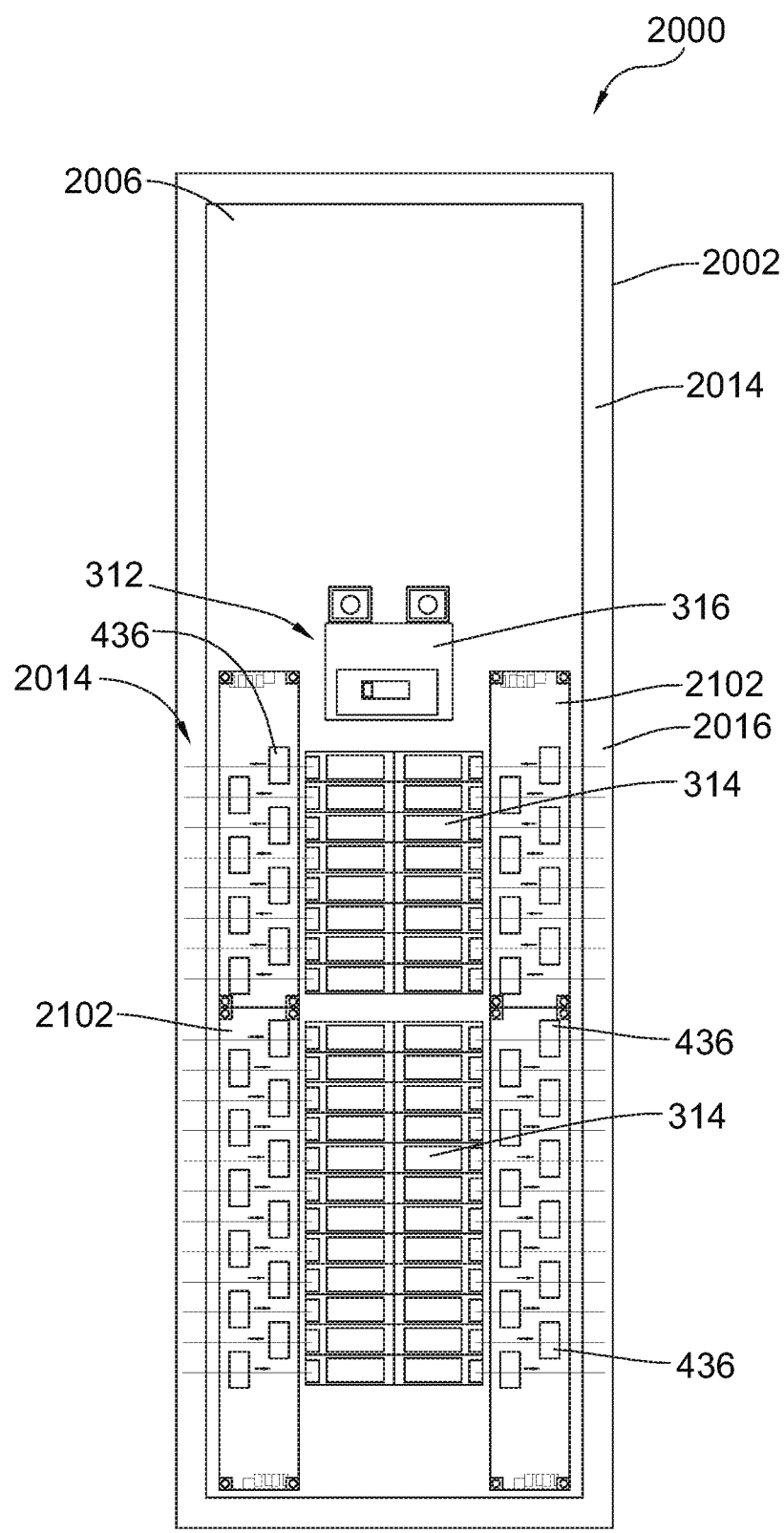
FIG. 21 shows a front view of the FIG. 20 service panel.

FIGS. 19, 20, and 21 illustrate another example of a service panel design that uses a wraparound wiring configuration. FIG. 19 shows a front view of the base service panel enclosure 302 to which the other components of this service panel design are installed in a fashion similar to that described above. FIG. 20 shows a back view of a portion of a service panel 2000. As shown, the service panel 2000 includes an enclosure 2002 that defines an interior 2004 in which the components of the service panel 2000 are housed. In the interior 2004, the service panel 2000 includes a mounting wall or panel door 2006 that is mounted in a similar location as the mounting wall 520 in FIG. 5. The panel door 2006 in one form is mounted via the hinges 530, 532 to the rest of the service panel 2000 in a fashion similar to that in FIG. 5.

In the illustrated design, the functions of the circuit control modules 110 are spread across opposite sides of the panel door 2006. In particular, the load shed switches 434 are in the form of a series of relays 206 mounted on the backside of the panel door 2006 (i.e., facing the base service panel enclosure 302) and the current transducers 436 are mounted to the front side of the panel door 2006. In one part, the relays 206 form a relay assembly 2008 that has a socket base 2010. In the illustrated example, the relays 206 are double pole single throw (DPST) relays, but other types of relays 206 can be used. For instance, as depicted in FIG. 20, the relays 206 are also in the form of a high density relay board 2012 that is mounted to the backside of the panel door 2006. Like the previously described examples, the service panel 2000 includes the wiring harness 208 that is electrically connected to the relays 206 in the relay assembly 2008 and the high density relay board 2012. In one form, the relay assembly 2008 and the high density relay board 2012 are respectively designed to handle high power loads and lower power loads, but it should be appreciated that the relay 206 can be configured differently in other examples to handle other types of load configurations. Looking at FIGS. 20 and 21, the enclosure 2002 and the panel door 2006 form a gap 2014 that allows conductive wiring 2016 from the relays 206 (i.e., load shed switches 434) from the backside (FIG. 20) to wrap around to the front side of the panel door 2006 (FIG. 21) to electrically connect to corresponding current transducers 436.

Turning to FIG. 21, the current transducers 436 in the illustrated example are in the form of current sensing boards 2102 that are mounted to the front side of the panel door 2006. The circuit breaker assembly 312 that includes multiple circuit breakers 314 is also mounted to the front side of the panel door 2006 along with the main circuit breaker 316. In the illustrated example, four current sensing boards 2102 are used, but more or less current sensing boards 2102 can be used in other examples. To conserve real estate on the service panel 2006 and simplify assembly, the current sensing boards 2102 are mounted on opposing sides of the circuit breaker assembly 312 such that the current sensing boards 2102 are positioned between the gap 2014 and the circuit breakers 314. The wraparound wiring design allows the load shed switches 434 and the current transducers 436 to be mounted on opposite sides of the panel door 2006 which in turn provides a compact design that conserves space on the panel door 2006 and simplifies installation. In other words, the splitting of the load shedding and current sensing functions of the circuit control module 110 facilitates the wraparound wiring design for compact construction. As shown, one of the wires from the relays 206 on the backside is wired to one of the current transducers 436 on the front side, which in turn is electrically connected to one of the circuit breakers 314. Each current sensing board 2102 typically (but not always) has the same number of current transducers 436 as circuit breakers 314 the current sensing board 2102 is facing. As shown, the current transducers 436 are arranged in an alternating staggered pattern so that the corresponding transducer is positioned close to the corresponding circuit breaker 314. It should be appreciated that the current sensing boards are modular in nature so the they can be easily swapped for others. While the service panel 2000 is wired in a similar fashion to that illustrated in FIG. 4, it should be appreciated that the load shed switches 434 and current transducers 436 are arranged in an opposite fashion with respect to the circuit breakers 314. Unlike in FIG. 4, the current transducers 436 in the service panel 2000 of FIGS. 20 and 21 are mounted between the circuit breakers 314 and the load shed switches 434.

Figure 22:
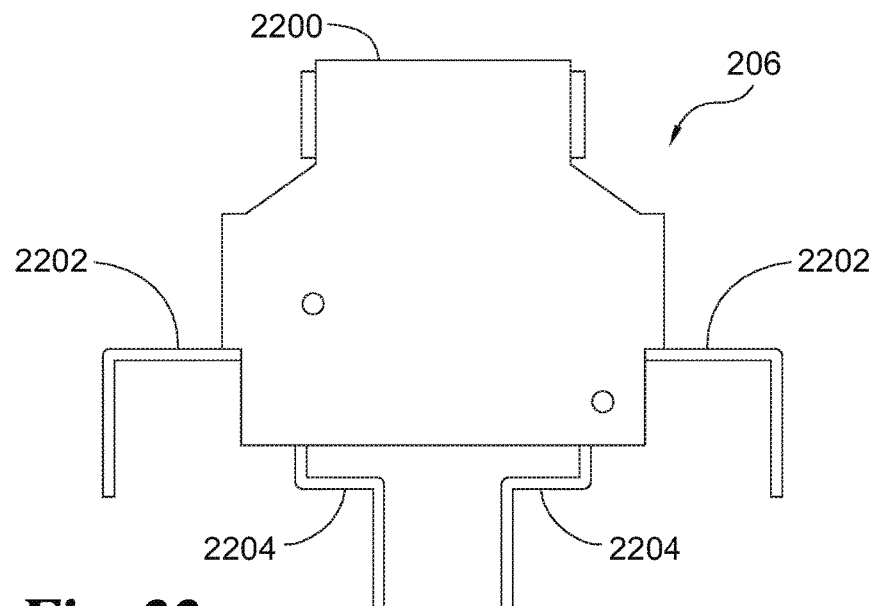
FIG. 22 shows a side view of a relay used in the FIG. 20 service panel.
Figure 23:
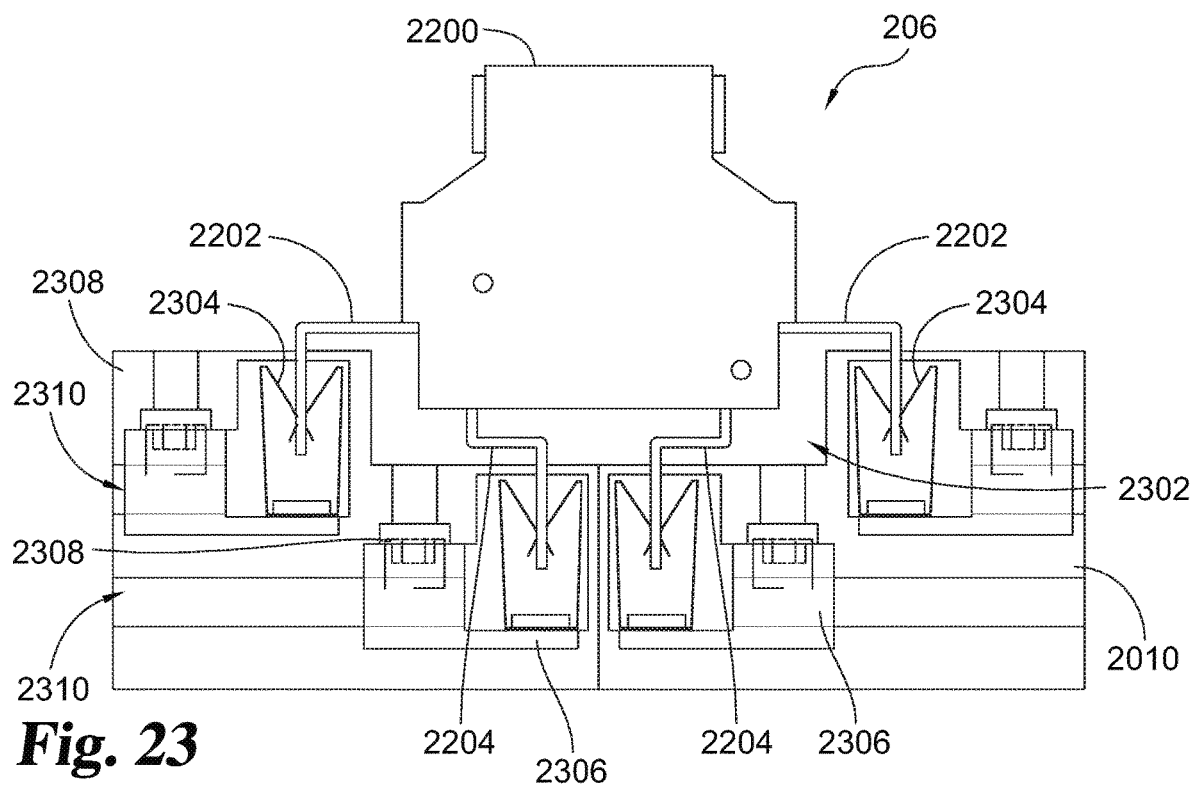
FIG. 23 shows a partial cross-sectional view of the FIG. 22 relay secured to a socket base in the FIG. 20 service panel.

The relays 206 in FIG. 20 have a unique design that is illustrated in FIGS. 22 and 23. As shown, relay 2200 is designed to be easily replaced as well as provides a compact footprint. In the illustrated example, the relays 2200 are further designed to control high power loads (e.g., for HVAC systems, dryers, etc. in households). The relay 2200 includes exterior contacts or connectors 2202 that are located on opposing sides of the relay 2200. As shown, the exterior connectors 2202 are L-shaped and extend away from the relay 2200. The relay 2200 further includes interior contacts or connectors 2204 that extend from the bottom of the relay. As depicted, the interior connectors 2204 have a zig-zag profile in which the interior connectors 2204 extend toward one another and then extend in a downwards direction, away from the relay 2200.

FIG. 22 shows a cross-sectional view of the socket base 2010 (FIG. 20) to which the relays 2200 are electrically connected. As shown, the socket base 2010 defines a socket channel 2302 in which a portion of the relay 2200 is received. The socket base 2010 includes exterior sockets 2304 to which the exterior connectors 2202 of the relay are connected and interior sockets 2306 to which the interior connectors 2204 are connected. Each socket 2304, 2306 includes a fastener 2308 for securing the wiring 2016 to the sockets 2304, 2306. The sockets 2304, 2306 further have wiring channels 2310 in which the wiring 2016 is threaded.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to the following terms or common variations thereof:

"Circuit Breaker" generally refers to an automatic device for stopping the flow of current in an electric circuit as a safety measure. In one form, the circuit breaker includes an automatically operated electrical switch designed to protect an electrical circuit from damage caused by any number of safety hazards, including (but not limited to) overcurrent, overload, and/or short circuit conditions. For instance, the circuit breaker functions to interrupt current flow after protective relays detect a fault. Typically, but not always, a circuit breaker includes a mechanical switching device, capable of making, carrying, and breaking currents under normal circuit conditions. Circuit breakers are also usually capable of making and carrying for a specified time and breaking currents under specified abnormal circuit conditions, such as those of a short circuit. Circuit breakers are commonly designed to open and close a circuit by non-automatic means and to open the circuit automatically on a predetermined overcurrent without damage to itself when properly applied within the rating of the circuit breaker. Typically, but not always, a circuit breaker is designed to be reset (either manually or automatically) to resume normal operation after being tripped. Circuit breakers can be made in varying sizes, from small devices that protect an individual household appliance up to large switchgear designed to protect high voltage circuits feeding an entire city. Components of the circuit breaker can include a frame or case made of metal or some type of electrical insulation, electrical contacts, an arc extinguishing assembly, an operating mechanism, and a trip unit that can have a thermal element, a magnetic element, or both. Circuit breakers can be typically secured in place by a through bolt type connection, a stab-lock to the busbar (or some type of receptacle) type connection, a bolted to the busbar type connection, and/or a din rail mounted type connection. The term "circuit breaker" is used in a broad sense to include any Automatic Disconnection of Supply (ADS) device for automatically removing power from a faulty system. By way of non-limiting examples, the circuit breakers can include low-voltage circuit breakers, medium-voltage circuit breakers, high-voltage circuit breakers, magnetic circuit breakers, thermal magnetic circuit breakers, explosive circuit breakers, common trip breakers, sulfur hexafluoride ($SF_6$) high-voltage circuit breakers, disconnecting circuit breakers (DCBs), and carbon dioxide ($CO_2$) high-voltage circuit breakers.

"Computer" generally refers to any computing device configured to compute a result from any number of input values or variables. A computer may include a processor for performing calculations to process input or output. A computer may include a memory for storing values to be processed by the processor or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer or characterized as separate and remote from the computer. A computer may be a single, physical, computing device such as a desktop computer or a laptop computer or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus a computer may include one or more physical processors or other computing devices or circuitry and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above. A computer may be optionally coupled to one or more visual displays and/or may include an integrated visual display. Likewise, displays may be of the same type or a heterogeneous combination of different visual devices. A computer may also include one or more operator input devices such as a keyboard, mouse, touchscreen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input, and output device arrangements are possible. Multiple computers or computing devices may be configured to communicate with one another or with other devices over wired or wireless communication links to form a network. Network communications may pass through various computers operating as network appliances such as switches, routers, firewalls, or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Display" or "Display Device" generally refers to any device capable of being controlled by an electronic circuit or processor to display information in a visual or tactile manner. A display device may be configured as an input device taking input from a user or other system (e.g. a touch sensitive computer screen), or as an output device generating visual or tactile information, or the display device may be configured to operate as both an input or output device at the same time, or at different times. The output may be two-dimensional, three-dimensional, and/or mechanical displays and includes, but is not limited to, the following display technologies: Cathode Ray Tube display (CRT), Light-Emitting Diode display (LED), Electroluminescent Display (ELD), electronic paper, Electrophoretic Ink (E-ink), Plasma Display Panel (PDP), Liquid Crystal Display (LCD), High-Performance Addressing display (HPA), Thin-film Transistor display (TFT), Organic Light-Emitting Diode display (OLED), Surface-conduction Electron-emitter Display (SED), laser TV, carbon nanotubes, quantum dot display, Interferometric Modulator Display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, and/or an array of red, yellow, and green indicators configured to indicate a temperature range.

"Input Device" generally refers to any device coupled to a computer that is configured to receive input and deliver the input to a processor, memory, or other part of the computer. Such input devices can include keyboards, mice, trackballs, and touch sensitive pointing devices such as touchpads or touchscreens. Input devices also include any sensor or sensor array for detecting environmental conditions such as temperature, light, noise, vibration, humidity, and the like.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, or servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a body area network (BAN), a personal area network (PAN), a local-area network (LAN), a metropolitan area network (MAN), a wide area network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks. A network may utilize different communication protocols or messaging techniques including layers or stacks of protocols. Examples include the Ethernet protocol, the Internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP Internet protocol suite may include an application layer, transport layer, Internet layer (including, e.g., IPv6), or link layer.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qualcomm of San Diego, Calif., USA. A processor also includes an Application-Specific Integrated Circuit (ASIC). An ASIC is an Integrated Circuit (IC) customized to perform a specific series of logical operations controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured. In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. The FPGA may be programmed to perform a specific series of instructions which may be retained in nonvolatile memory cells in the FPGA. The FPGA may be configured by a customer or a designer using a hardware description language (HDL). The FPGA may be reprogrammed using another computer to reconfigure the FPGA to implement a new set of commands or operating instructions. Such an operation may be executed in any suitable means such as by a firmware upgrade to the processor circuitry. Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Service Panel" or "Electric Distribution Panel" generally refers to a component of an electricity supply system that divides an electrical power feed into subsidiary circuits while providing protective circuit breakers for the circuit in one or more common enclosures. A service panel is also sometimes commonly referred to as a "breaker box" or a "fuse box." The service panel can include main panels and sub-panels.

"Service Panel Enclosure" generally refers to a housing for electrical components of the service panel configured to provide a degree of protection to personnel against access to hazardous parts, a degree of protection to personnel with respect to harmful effects of components housed inside (e.g., prevent electric shock), and/or a degree of protection of the equipment inside the enclosure against ingress of foreign items (e.g., dirt, water, etc.). The service panel enclosure typically, but not always, has a generally rectangular box or cube shape, but it can have other shapes. By way of non-limiting examples, the service panels can include metallic and non-metallic enclosure types specified in the technical standards of the National Electrical Manufacturers Association (NEMA).

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A service panel system, comprising:
a base service panel enclosure;
an extension service panel enclosure attached to the base service panel enclosure;
a controller;
a main power control module operatively connected to the controller, wherein the main power control module is configured to receive electrical power from a utility;
a circuit control module operatively connected to the controller; and
a circuit breaker assembly electrically connected between the main power control module and the circuit control module including
a main circuit breaker electrically connected to the main power control module to receive the electrical power from the main power control module, and
a plurality of circuit breakers electrically connected to the main circuit breaker,
wherein the circuit breakers are electrically connected to the circuit control module,
wherein the circuit breakers are housed inside the extension service panel enclosure.

2. The service panel system of claim 1, wherein:
the main power control module includes a main power disconnect switch; and
the main power control module is configured to monitor the electrical power upstream from the main power disconnect switch to sense whether the utility is supplying the electrical power.

3. The service panel system of claim 1, wherein the circuit control module for each of the circuit breakers includes
a load shed switch to open load circuits without tripping the circuit breakers, and
a transducer to monitor an electrical property of the load circuits.

4. The service panel system of claim 1, wherein the circuit breaker assembly includes a bus bar electrically connecting the main circuit breaker with the circuit breakers.

5. The service panel system of claim 1, further comprising:
a powered switch operatively connected to the controller, main power control module, and the circuit control module to facilitate communication, wherein the powered switch powers the controller, main power control module, and the circuit control module; and
a power supply connected to the powered switch for powering the powered switch during a power outage.

6. The service panel system of claim 1, further comprising:
an auxiliary power control module operatively connected to the controller.

7. The service panel system of claim 1, further comprising:
a harness electrically connecting the circuit control module to load circuits.

8. The service panel system of claim 1, wherein:
the extension service panel enclosure includes a mounting wall; and
the circuit breakers are mounted to one side of the mounting wall and the circuit control module is mounted to the side of the mounting wall opposite the circuit breaker.

9. The service panel system of claim 1, wherein the base service panel enclosure is a preexisting enclosure from a preexisting service panel.

10. The service panel system of claim 1, wherein the extension service panel enclosure defines one or more wiring openings that open into the base service panel enclosure.

11. The service panel system of claim 1, further comprising:
an adapter connected to the base service panel enclosure, wherein the adapter has an adapter hinge connected to the extension service panel enclosure.

12. The service panel system of claim 11, further comprising:
a breaker access door;
an outer cover; and
wherein the extension service panel enclosure includes a double hinge securing the breaker access door and the outer cover to the extension service panel enclosure in a hinged manner.

13. The service panel system of claim 1, wherein:
the circuit control module includes a switch to open and close the circuit; and
the controller is configured to open and close the circuit by transmitting a signal to the circuit control module.

14. The service panel system of claim 1, wherein the circuit breakers are standard, non-remotely controlled circuit breakers.

15. The service panel system of claim 1, further comprising:
an auxiliary power control module operatively connected to the controller, wherein the auxiliary power control module includes an inverter;
a battery pack electrically connected to the inverter; and
wherein the inverter is electrically connected to the circuit breakers.

16. The service panel system of claim 15, wherein the controller is designed to automatically enable or disable a circuit connected to at least one of the circuit breakers when auxiliary power is active.

17. The service panel system of claim 15, wherein the controller is configured to control an auxiliary power system and/or an electrical vehicle (EV) for coordinating load shedding and supplemental capacity during peak usage periods.

18. The service panel system of claim 1, wherein the controller is configured to allow a utility to control a circuit connected to at least one of the circuit breakers to temporarily disable the circuit during peak demand periods.

19. A service panel system, comprising:
a controller;
a main power control module operatively connected to the controller, wherein the main power control module is configured to receive electrical power from a utility;
a circuit control module operatively connected to the controller;
a circuit breaker assembly electrically connected between the main power control module and the circuit control module including
a main circuit breaker electrically connected to the main power control module to receive the electrical power from the main power control module, and
a plurality of circuit breakers electrically connected to the main circuit breaker,
wherein the circuit breakers are electrically connected to the circuit control module;
an auxiliary power control module operatively connected to the controller, wherein the auxiliary power control module includes an inverter;
a battery pack electrically connected to the inverter; and
wherein the inverter is electrically connected to the circuit breakers.

20. The service panel system of claim 19, wherein the controller is designed to automatically enable or disable a circuit connected to at least one of the circuit breakers when auxiliary power is active.

21. The service panel system of claim 19, wherein the controller is configured to control an auxiliary power system and/or an electrical vehicle (EV) for coordinating load shedding and supplemental capacity during peak usage periods.

22. The service panel system of claim 19, wherein:
the main power control module includes a main power disconnect switch; and
the main power control module is configured to monitor the electrical power upstream from the main power disconnect switch to sense whether the utility is supplying the electrical power.

23. The service panel system of claim 19, wherein the circuit control module for each of the circuit breakers includes
a load shed switch to open load circuits without tripping the circuit breakers, and
a transducer to monitor an electrical property of the load circuits.

24. The service panel system of claim 19, wherein the circuit breaker assembly includes a bus bar electrically connecting the main circuit breaker with the circuit breakers.

25. The service panel system of claim 19, further comprising:
a harness electrically connecting the circuit control module to load circuits.

26. The service panel system of claim 19, wherein:
the circuit control module includes a switch to open and close the circuit; and
the controller is configured to open and close the circuit by transmitting a signal to the circuit control module.

27. The service panel system of claim 19, wherein the circuit breakers are standard, non-remotely controlled circuit breakers.

28. The service panel system of claim 19, wherein the controller is configured to allow a utility to control a circuit connected to at least one of the circuit breakers to temporarily disable the circuit during peak demand periods.

* * * * *